United States Patent
Fukaya

[11] Patent Number: 5,990,891
[45] Date of Patent: Nov. 23, 1999

[54] APPARATUS AND METHOD FOR TRANSMITTING AN ATTRIBUTE VALUE BETWEEN ITEMS BY A USER'S OPERATION

[75] Inventor: Tetsuji Fukaya, Kanagawa-ken, Japan

[73] Assignee: Kabushiki Kaisha Toshiba, Kawasaki, Japan

[21] Appl. No.: 08/976,511

[22] Filed: Nov. 24, 1997

[30] Foreign Application Priority Data

Nov. 25, 1996 [JP] Japan .................................. 8-313979

[51] Int. Cl.⁶ .................................................. G06F 3/00
[52] U.S. Cl. ........................ 345/349; 345/339; 345/348; 345/964; 345/967; 709/303
[58] Field of Search ..................... 345/145, 339, 345/346, 348–349, 356, 964–965, 967, 970; 364/188; 709/303

[56] References Cited

U.S. PATENT DOCUMENTS

| | | | |
|---|---|---|---|
| 5,040,131 | 8/1991 | Torres | 345/352 |
| 5,261,043 | 11/1993 | Wolber et al. | 345/347 |
| 5,293,476 | 3/1994 | Wolber et al. | 345/356 |
| 5,313,574 | 5/1994 | Beethe | 345/356 |
| 5,313,575 | 5/1994 | Beethe | 345/356 |
| 5,325,481 | 6/1994 | Hunt | 345/347 |
| 5,371,844 | 12/1994 | Andrew et al. | 345/339 |
| 5,377,318 | 12/1994 | Wolber | 345/347 |
| 5,422,993 | 6/1995 | Fleming | 345/348 |
| 5,428,734 | 6/1995 | Haynes et al. | 345/349 |
| 5,481,668 | 1/1996 | Marcus | 345/349 |
| 5,506,952 | 4/1996 | Choy et al. | 345/348 |
| 5,574,918 | 11/1996 | Hurley et al. | 395/561 |
| 5,608,860 | 3/1997 | Fitzpatrick et al. | 345/352 |
| 5,745,112 | 4/1998 | Hirose | 345/349 |
| 5,760,775 | 6/1998 | Sklut et al. | 345/349 |
| 5,767,853 | 6/1998 | Yoshida et al. | 345/349 |
| 5,790,119 | 8/1998 | Sklut et al. | 345/349 |
| 5,872,569 | 2/1999 | Salgado et al. | 345/349 |

FOREIGN PATENT DOCUMENTS 6-60136  3/1994  Japan .

*Primary Examiner*—Raymond J. Bayerl
*Assistant Examiner*—X. L. Bautista
*Attorney, Agent, or Firm*—Finnegan, Henderson, Farabow, Garrett & Dunner, L.L.P.

[57] ABSTRACT

In an operation support apparatus, an item memory section stores a plurality of items and attribute data. The plurality of items to be operated are displayed. A user's operation for one of the items is inputted. An intention decision section decides an operation intention according to the user's operation. An estimation section estimates a permissible future operation of the user according to the operation intention and the attribute data of each item. The items to be operated by the permissible operation are discriminated from other items during displaying the plurality of items.

16 Claims, 19 Drawing Sheets

| ATTRIBUTE | VALUE | |
|---|---|---|
| INPUT/OUTPUT | INPUT | } FIXED ATTRIBUTE |
| DATA TYPE | ANALOG | |
| UNIT | UNDECIDED | } NON-FIXED ATTRIBUTE |
| | | |
| | | |

910

| SYMBOL 1 |
|---|
| SYMBOL 1. TERMINAL 2. UNIT = = SYMBOL 1. TERMINAL 3. UNIT<br>SYMBOL 1. TERMINAL 3. UNIT = = SYMBOL 1. TERMINAL 2. UNIT |
| AS FOR ALL SYMBOLS OF SYMBOL 1, UNIT ATTRIBUTE VALUE OF TERMINAL OF TERMINAL 2 IS EQUAL TO UNIT ATTRIBUTE VALUE OF TERMINAL OF TERMINAL 3. UNIT ATTRIBUTE VALUE OF TERMINAL OF TERMINAL 3 IS EQUAL TO UNIT ATTRIBUTE VALUE OF TERMINAL OF TERMINAL 2. |

920

| SYMBOL 2 |
|---|
| SYMBOL 2. TERMINAL 1. UNIT = = SYMBOL 2. TERMINAL 2. UNIT<br>SYMBOL 2. TERMINAL 2. UNIT = = SYMBOL 2. TERMINAL 1. UNIT |
| AS FOR ALL SYMBOLS OF SYMBOL 2, UNIT ATTRIBUTE VALUE OF TERMINAL OF TERMINAL 1 IS EQUAL TO UNIT ATTRIBUTE VALUE OF TERMINAL OF TERMINAL 2. UNIT ATTRIBUTE VALUE OF TERMINAL OF TERMINAL 2 IS EQUAL TO UNIT ATTRIBUTE VALUE OF TERMINAL OF TERMINAL 1. |

930

| SYMBOL 3 |
|---|
| SYMBOL 4. TERMINAL 3. UNIT = = "A (CURRENT)" |
| AS FOR ALL SYMBOLS OF SYMBOL 4, UNIT ATTRIBUTE VALUE OF TERMINAL OF TERMINAL 3 IS EQUAL TO "A". |

*FIG. 9*

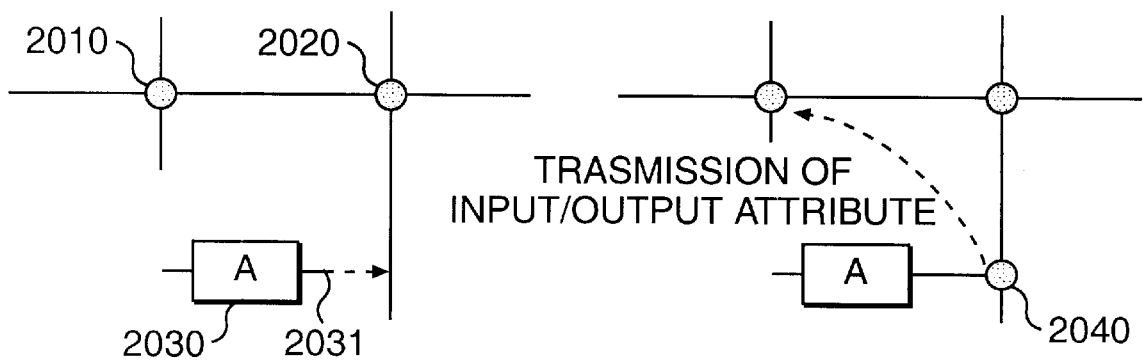
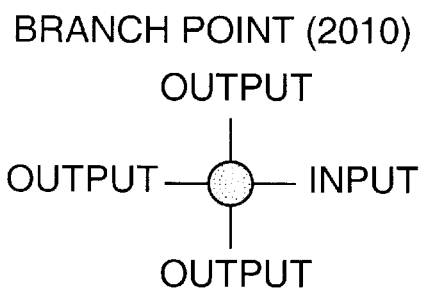
BRANCH POINT (2010)
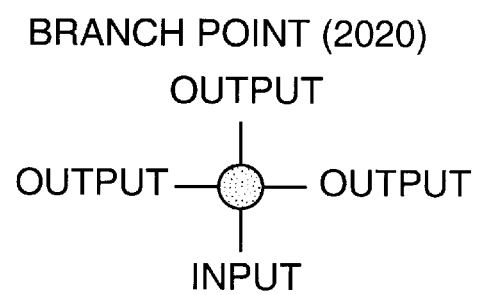
BRANCH POINT (2020)
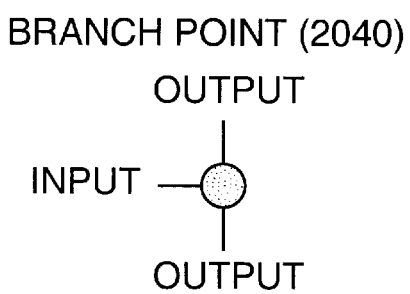
BRANCH POINT (2040)
FIG. 20

APPARATUS AND METHOD FOR TRANSMITTING AN ATTRIBUTE VALUE BETWEEN ITEMS BY A USER'S OPERATION

FIELD OF THE INVENTION

The present invention relates to an operation support apparatus and a method for a user to smoothly operate an item while displaying a plurality of items.

BACKGROUND OF THE INVENTION

In the development area of software, system/software design is executed by using a figure on a computer according to various methods. In this case, when the user finishes designing the system/software, he checks the content of the description result. Alternatively, the user selects "check item" and the computer automatically checks the description result according to a predetermined rule. However, if an error part is found in the description, it often happens that the influence of the error is extended not only to the error part but also to other part of the description. Therefore, much of the user's time is spent making corrections. In short, while operating the computer, there is no function for checking the user's description.

Recently, in the GUI (Graphical User Interface) environment, in order to print a file, a first icon representing the file is moved to a second icon representing the printer on the display by using a mouse. However, if a plurality of printers is connected to the computer, the user needs to know the most suitable printer in terms of paper size, color characteristics (color/monochrome), etc. In this case, he must previously examine the attribute of each printer and his work load greatly increases. In short, when selecting a printer, there is no function for presenting support information to the user.

As mentioned-above, in the computer system of the prior art, there is no function to support the user's operation during operation of the computer. Therefore, it often happens that the user cannot smoothly operate the computer to design a plan, write a description, or select, the most suitable icon (equipment) through the display.

SUMMARY OF THE INVENTION

It is an object of the present invention to provide an operation support apparatus and a method which is able to present a support function for the user while operating the computer.

According to the present invention, there is provided an operation support apparatus, comprising: an item memory means for previously storing a plurality of items and attribute data for each item; a display means for displaying the plurality of items to be operated; an input means for inputting user's initial, primitive, or current operation for one of the items; an intention decision means for deciding the operation intention according to the user's current operation; and an estimation means for estimating a permissible future operation of the user hereafter according to the operation intention and the attribute data of each item, wherein the items to be operated by the permissible future operation are discriminated from other items during display of the plurality of items.

Further, in accordance with the present invention, there is also provided an operation support method, comprising the steps of: storing a plurality of items and attribute data for each item; displaying the plurality of items to be operated; inputting user's current operation for one of the items; deciding the operation intention according to the user's current operation; estimating a permissible future operation of the user hereafter according to the operation intention and the attribute data of each item; and discriminating the item corresponding to the permissible future operation from other items.

Further, in accordance with the present invention, there is also provided a computer readable memory containing computer readable instructions, comprising: an instruction means for causing a computer to store a plurality of items and attribute data for each item; an instruction means for causing a computer to display the plurality of items to be operated; an instruction means for causing a computer to input a user's current operation for one of the items; an instruction means for causing a computer to decide an operation intention according to the user's current operation; an instruction means for causing a computer to estimate a permissible future operation of the user hereafter according to the operation intention and the attribute data of each item; and an instruction means for causing a computer to discriminate the item corresponding to the permissible future operation from other items.

BRIEF DESCRIPTION OF THE DRAWINGS

FIG. 9 is a schematic diagram of sample constraint information stored in a description constraint memory section of the present invention.

FIG. 20 is a schematic diagram of a sample of three branch points to which the attribute value is transmitted.

DETAILED DESCRIPTION OF THE PREFERRED EMBODIMENT

Figure 1:
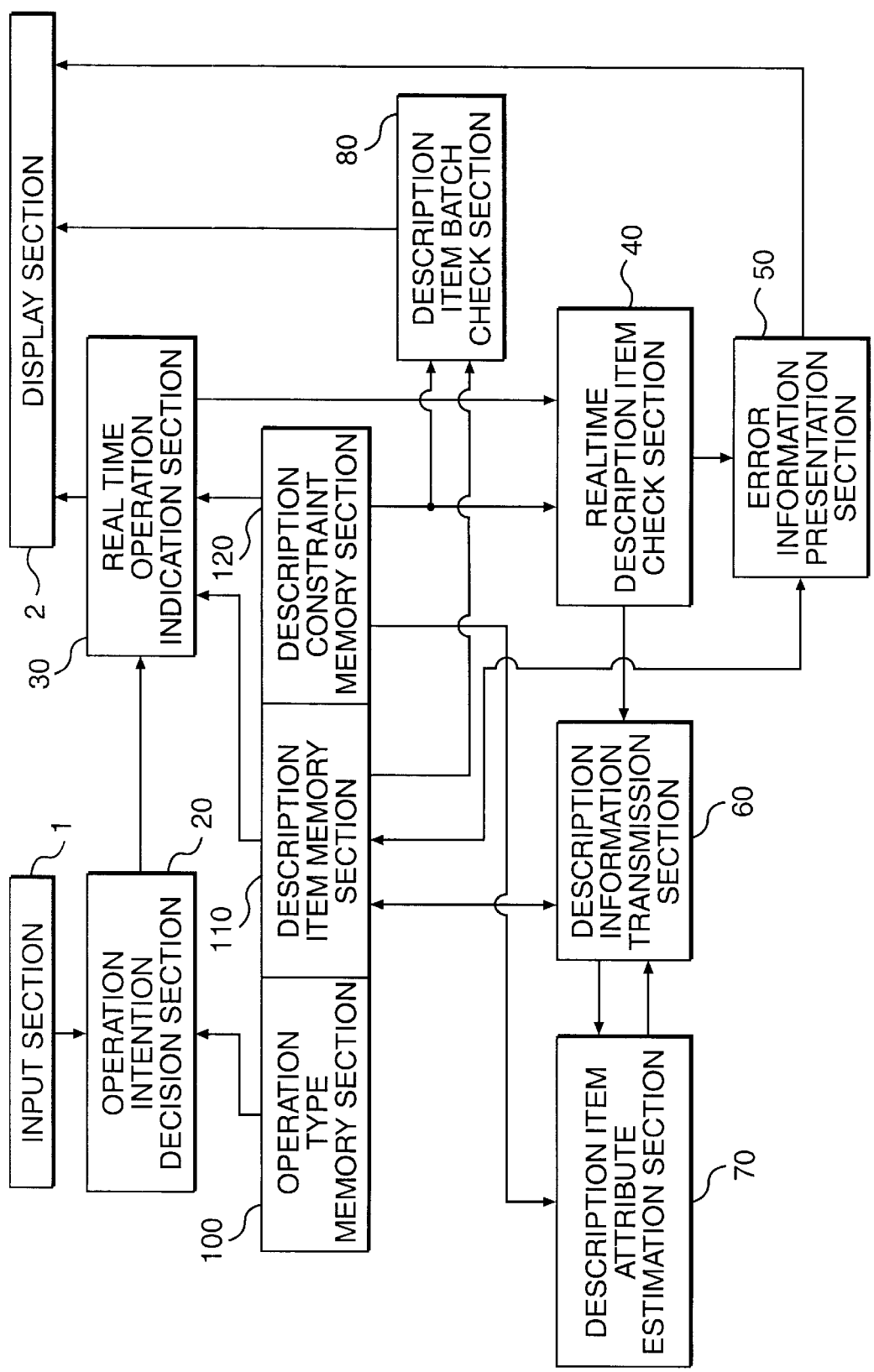
FIG. 1 is a block diagram of the operation support apparatus according to the present invention.
Figure 2:
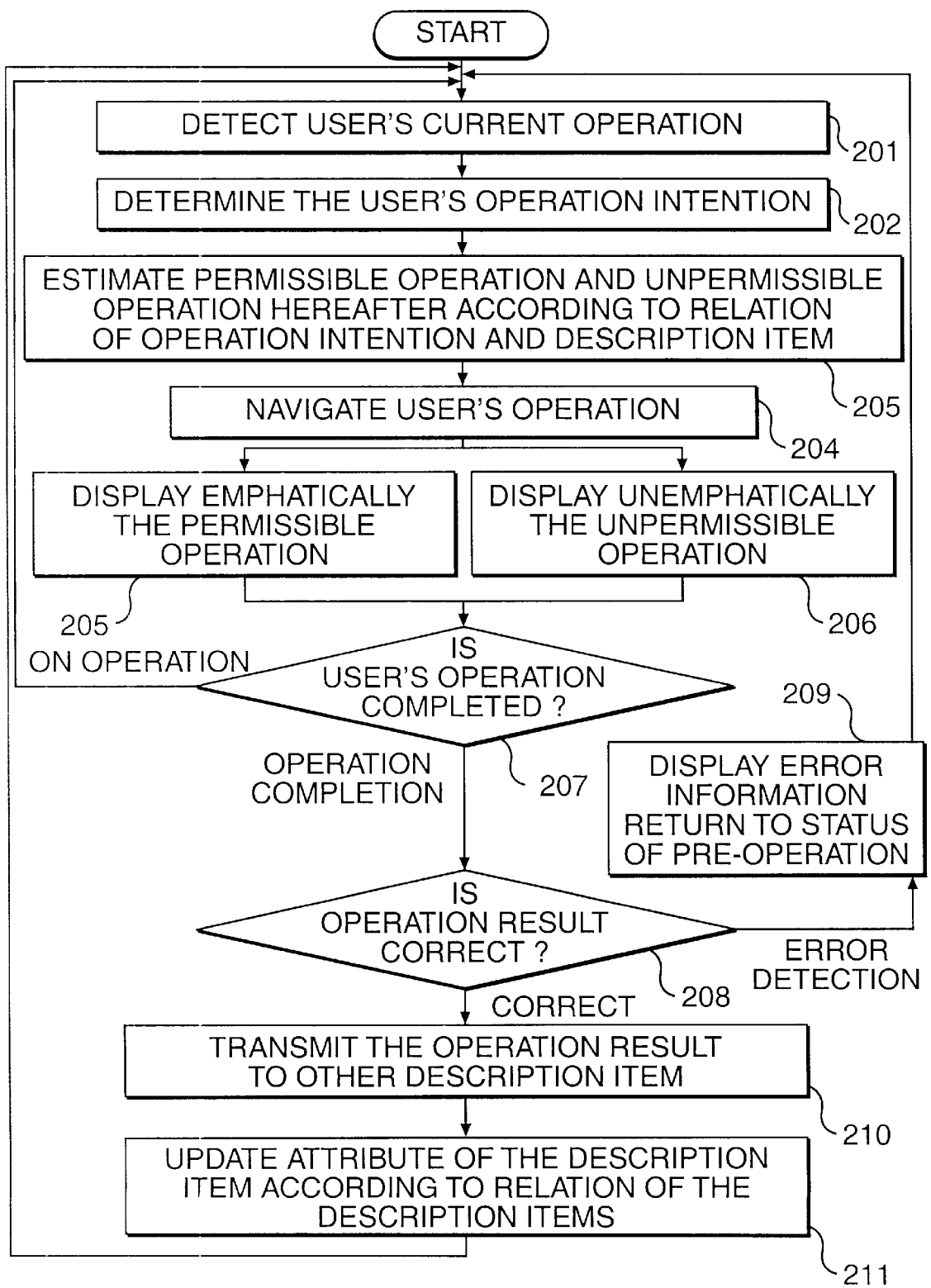
FIG. 2 is a flow chart of processing of the operation support method according to the present invention.

FIG. 1 is a schematic diagram of the operation support apparatus according to the present invention. FIG. 2 is a flow chart of the processing of the operation support method according to the present invention. Assume that the user designs the description (plan) through an input section 1 such as a keyboard/mouse. Each item in the description is orderly stored in a description item memory section 110. An operation inputted by the user is supplied to the operation support apparatus as a signal. An operation intention decision section 20 detects the user's operation according to the signal (step 201). The user's operation is, for example, location, moving, or deletion of an item. Some operations are completed by one indication, and other operations are completed by a series of indications. For example, a move operation of an item is executed by dragging the item. The user selects the item by depressing a mouse button on the display, moves the icon by continuing to depress the mouse button, and releasing the mouse button when the icon has reached the desired position to complete the move operation. In this way, some kinds of operations are completed by a plurality of indications. An operation type memory section 100 previously stores each type of operation permitted in the editor or memory of the computer. The operation intention decision section 20 determines the user's intended operation by detecting a series of operations and referring to the operation type memory section 100 (step 202). A description item memory section 110 previously stores each kind of item data including the attribute value. A description constraint memory section 120 previously stores the constraints regarding the relation between the items. (These data are explained in detail afterward.) A real time operation indication section 30 retrieves the data of the object item to be operated by the user and the other item related to the object item from the description item memory section 110, and retrieves the constraint corresponding to the object item and the related item from the description constraint memory section 120. The real time operation indication section 30 estimates the operation item (area) permissible for the user according to the retrieved item data and constraint, and presents the operation item (area) information through a display section 2 as navigation information (steps 203, 204). The display section 2 represents a screen of an editor. In the example of a move operation of the item, when the operation item (area) permissible for the user is estimated, the operation item (area) is outputted through the display section 2. Alternatively, an operation area unpermissible for the user's operation may be discriminately displayed (steps 205, 206).

A real time description item check section 40 detects completion of the user's operation (step 207) and checks whether the operation result is consistent with the constraints stored in the description constraint memory section 120 (steps 207, 208). If the operation result is inconsistent with the constraint, an error information presentation section 50 outputs an error message through the display section 2 and returns the status of the items of the display to a pre-operation condition according to the item data stored in the description item memory section 110 (step 209). If the operation result is consistent with the constraint, the attribute data of the item operated by the user is supplied to a description item attribute estimation section 70 through a description information transmission section 60 (step 210). Some constraints are determined simply, but other constraint are determined by tracing the relation between the items. The attribute value of the item consists of a fixed attribute value and a non-fixed attribute value. The non-fixed attribute value is determined by the relation between the item and other items. The description item attribute estimation section 70 retrieves the other item related to the operated item from the description item memory section 110 and updates the attribute value of the other related items by using the attribute value of the operated item (step 211). A description item batch check section 80 checks the plan (description) not checked by the real time description item check section 40 according to the constraints stored in the description constraint memory section 120. The checked result is outputted through the display section 2.

Next, the detailed processing of the operation support apparatus is explained by using a concrete example. The first example is a device for drawing and/or designing an electrical circuit. The device may be software for a microprocessor or some CAD (computer aided design) apparatus.

Figure 3:
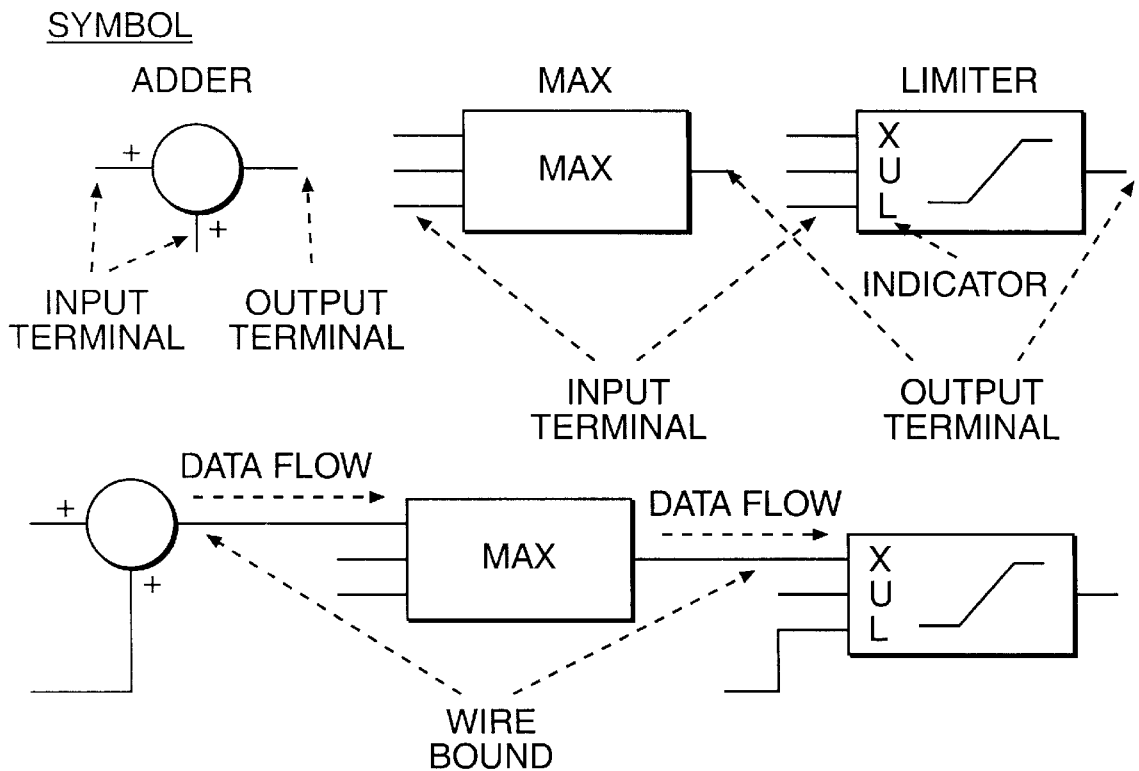
FIG. 3 is a schematic diagram of examples of symbols described in the operation support apparatus.

Assume that the user draws a block chart by using symbols through a display. FIG. 3 shows three symbols (upper part) and the block chart (lower part). The block chart is composed by the symbols and wiring between the symbols. The symbols are located at suitable positions and linked by wiring on display. The symbol includes a plurality of terminals and wired bound links between a terminal of the first symbol and a terminal of the second symbol. In order to discriminate a plurality of terminals in one symbol, indicators such as "X" "U", "L" are written in the symbol as shown in LIMITTER of FIG. 3. Assume that the block chart is used as a description of the control plan. In this case, the symbol represents function and calculation, and the wire bound between the symbols represents data flow. Each terminal in the symbol represents input or output. For example, "ADDER", "MAX" (function to output a maximum), "LIMITER" (upper limit/lower limit is set for the input signal; input signal is outputted if the input signal is within the limit. Otherwise, the upper limit value/lower limit value is outputted) are used as the symbol. As shown in FIG. 3, the "ADDER" symbol includes two input terminals and one output terminal. The "MAX" symbol includes three input terminals and one output terminal. The "LIMITER" symbol includes three input terminals and one output terminal. In FIG. 3, the "ADDER" symbol is wired to the "MAX" symbol and the "MAX" symbol is connected to the "LIMITER" symbol. In this case, the output data of the "ADDER" is input data of the "MAX", and output data of the "MAX" is input data of the "LIMITER". In this way, data flow is defined by wire bound. (By wire bound, we mean the wire connection between the elements described above.) As an alternative to the function/calculation symbol, an input/output symbol and constant symbol are used. The input symbol represents data input from another area of the block chart to be operated. The output symbol represents data output to another area of the block chart. The constant symbol represents a threshold value. For example, the constant symbol is used for setting the upper limit/lower limit to the "LIMITER". In this place, assume that an error in the wired operation is detected. The wired operation is executed by two kinds of operations.

A mouse button is depressed on a terminal of the symbol. The mouse is moved while the mouse button remains depressed. This operation is completed when the mouse button is released on another part of the display.

If the other part is another terminal, it is a wired operation.

If the other part is not another terminal, a line with one free side is drawn.

A mouse button is clicked on the end of the wire bound linked to a terminal. The mouse is moved while the mouse button remains depressed. The operation is completed when the mouse button is released on the other part.

If the other part is another terminal, it is a wired operation.

If the other part is not another terminal, a line with one free side is drawn.

The Operation Intention Decision Section 20

Figure 4:
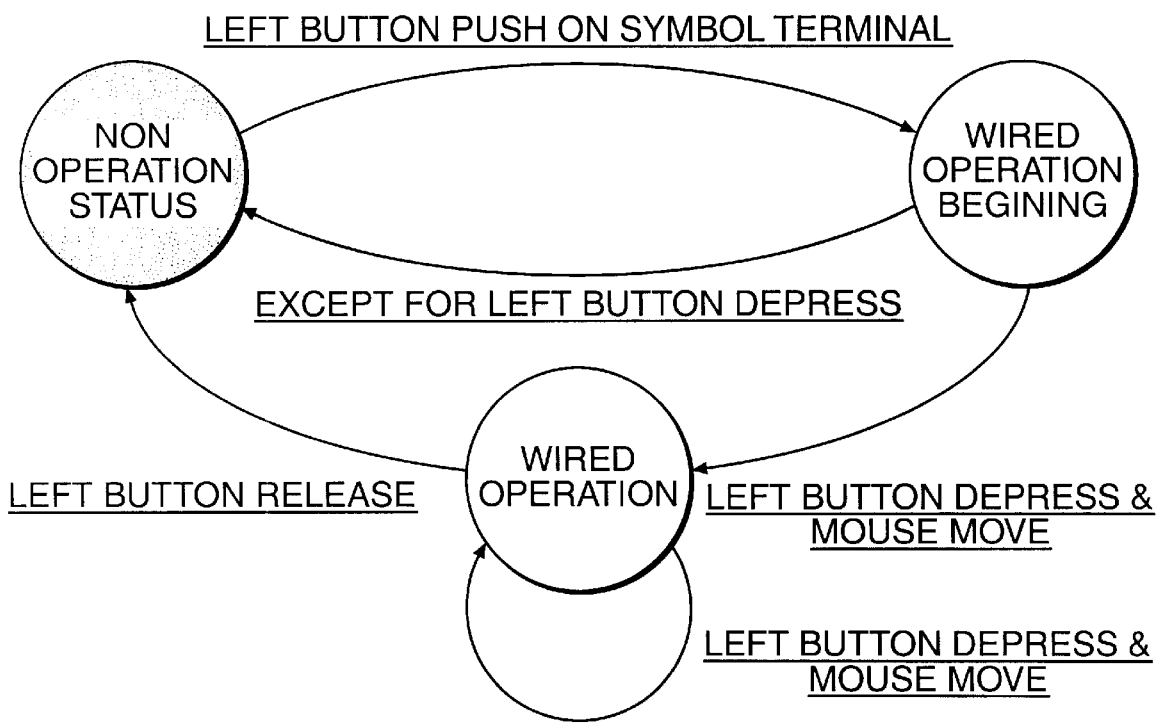
FIG. 4 is a schematic diagram of an example of a status transition of operation.

The input section 1 informs the user's operation to the operation intention decision section 20. The user's operation is the current operation, i.e., moving the mouse, depressing the mouse button. The current operation is determined to be a permissible operation by the editor of the apparatus. If it is not a permissible operation, processing of the user's operation is not executed thereafter. As shown in FIG. 4, a series of effective operations are stored in the operation type memory section 100 as the transitional operational status. In FIG. 4, a circle represents the operational status and a line between the circles represent a transition to an indicated status if the current operation on the line is executed. In non-operational status of the black circle, when the left button of the mouse is depressed on a terminal of the symbol, the status of the terminal transitions to the status at the begining of a wired operation. If the mouse is moved while the left button remains depressed, the status transitions to a status of a wired operation. If the mouse continues to move while the left button remains depressed in a wired operation, the status of the wired operation continues. If the left button is released, the wired operation is completed and the status is returned to the non-operational status. If an operation other than depressing the left button is executed during a wired operation, the status is returned to the non-operation status. In short, according to information of the operation type memory section 100 in FIG. 4, the user's operation intention is determined by the current operation.

The Real Time Operation Indication Section 30

By using the type of operation determined by the operation intention decision section 20, information of the description item memory section 110, and information of the description constraint memory section 120, navigational information of the user's operation is presented. First, the contents of the description item memory section 110 and the description constraint memory section 120 are explained in detail.

The Description Item Memory Section 110

Figure 5:
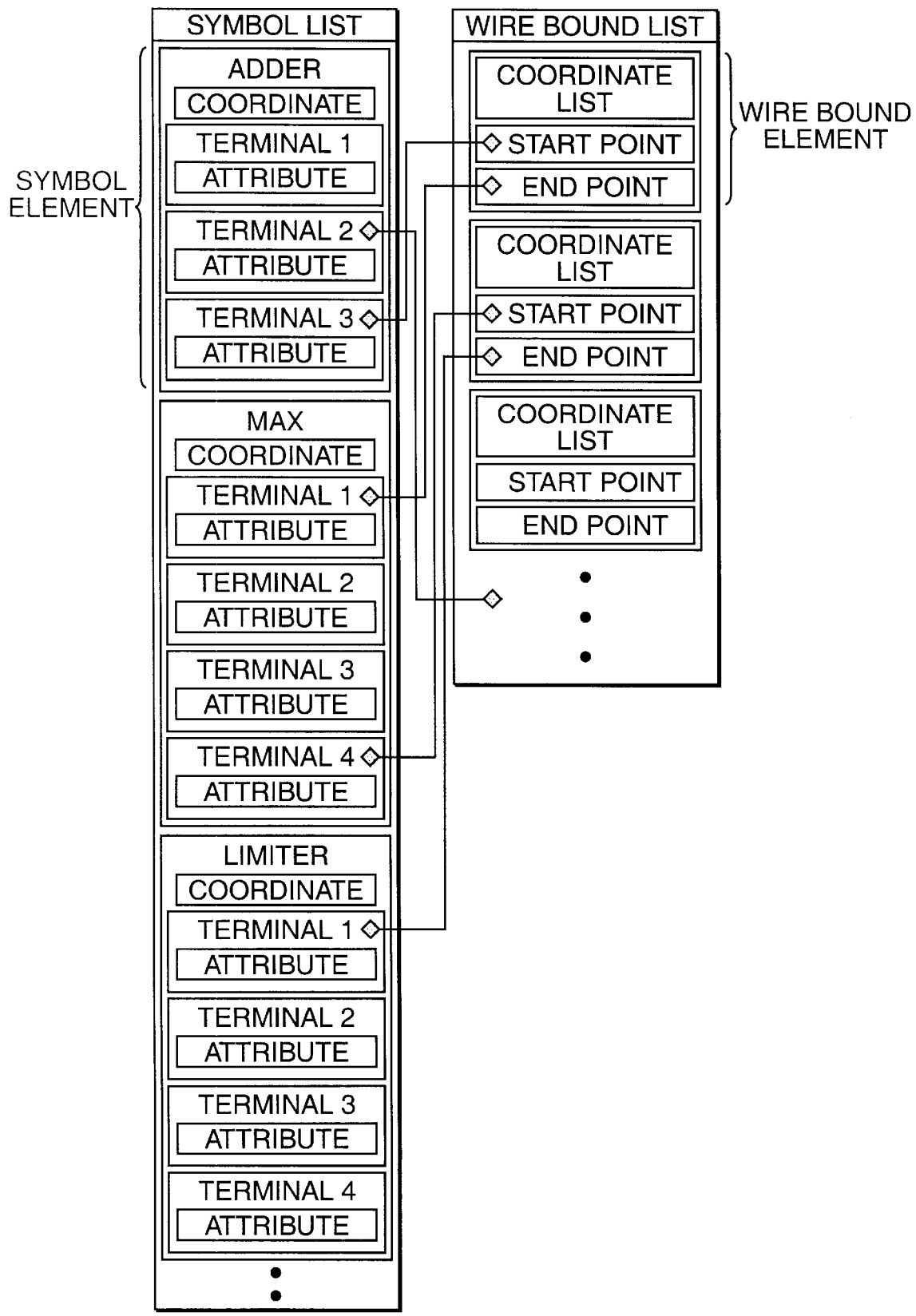
FIG. 5 is a schematic diagram of data stored in a description item memory section of the present invention.

The items in block chart of FIG. 3 (lower part) are stored in the description item memory section 110 as shown in FIG. 5. The item data in FIG. 5 consists of a symbol list and a wire bound list. In the symbol list, symbol elements such as "ADDER", "MAX", "LIMITER" are stored as follows.

kind of symbol: ("ADDER", "MAX", "LIMITER")

"COORDINATE": plotted coordinate of the symbol on display

"TERMINAL N": terminal data in the symbol

Wire bound information and attribute information of the terminals are also stored. In the example of FIG. 3, "MAX" includes four terminals (three input terminals+one output terminal). The first input terminal (TERMINAL 1) is linked as an end point of the first wire bound. The output terminal (TERMINAL 4) is linked as start point of a second wire bound. In FIG. 5, the wire bound list stores information of each wire bound in order as follows.

COORDINATE LIST: plotted coordinate of the wire bound on display

START POINT: A pointer to the terminal of the symbol as the start point. (In FIG. 3, the first wire bound connects the output terminal of ADDER and the first input terminal of MAX. In FIG. 5, the start point of the first coordinate list is pointed to TERMINAL 3 (the output terminal) of ADDER.)

END POINT: A pointer to the terminal of the symbol as the end point. (In FIG. 3, the first wire bound connects between the output terminal (TERMINAL 3) of ADDER and the first input terminal (TERMINAL 1) of MAX. In FIG. 5, the end point of the first coordinate list is pointed to TERMINAL 1 of MAX.)

Attribute (Semantic Information)

Figures 6, 7:
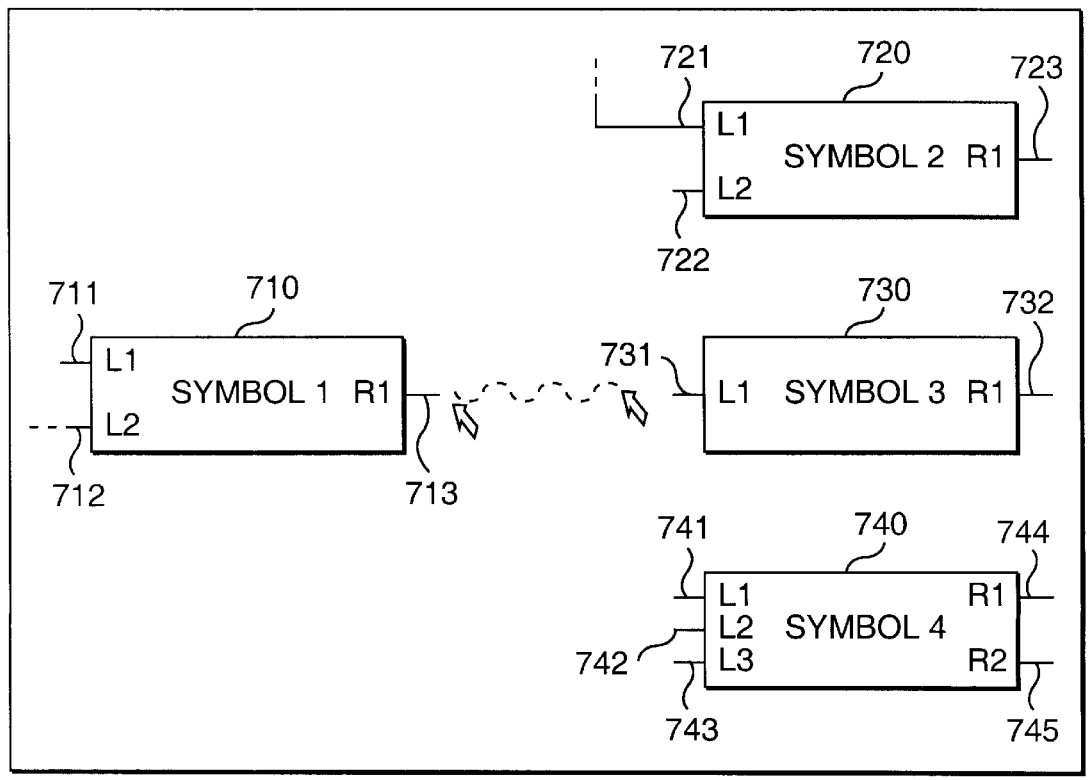
FIG. 6 is a schematic diagram of the attribute value of an item.
FIG. 7 is a schematic diagram of a sample of a plan.

The attribute of the item is very important in the present invention. As shown in FIG. 6, attribute data consists of an "ATTRIBUTE" and "VALUE". The attribute data in FIG. 6 corresponds to TERMINAL 1 of ADDER in FIG. 3.

INPUT/OUTPUT: The kind of terminal (in FIG. 6, an input terminal).

DATA TYPE: Date transmitted through the terminal. In this embodiment, "ANALOG" and "DIGITAL" are used (in FIG. 6, "ANALOG").

UNIT: As for the terminal whose data type is analog, the unit is assigned as an attribute. The unit of "ADDER" is determined by the symbol connected to the terminal (in FIG. 6, the unit is not determined).

Attributes can be fixed or non-fixed. The fixed-attribute is the same for all symbols in one block chart. The non-fixed attribute is determined by information to other symbol connected to the wire bound. If the status of the wire bound is changed, the non-fixed attribute value is also changed. The attribute is not limited to the above-mentioned three kinds (INPUT/OUTPUT, DATA TYPE, UNIT). In the symbol list of FIG. 5, "TERMINAL N" (and "ATTRIBUTE") are called the item as one unit.

The Description Constraint Memory Section 120

This section stores the constraint between the items referred by the real time description item check section 40. The constraint is defined based on the attribute of the terminal. In this case, the constraint is classified into two kinds: symbol dependent and symbol independent.

The Constraint for Input/Output Attribute

This constraint is independent of the kind of the symbol. For example, when wire bound connects between two terminals, it is impossible that two terminals, each of which have an input/output attribute value "OUTPUT", are connected each other, because data flow of the two terminals is inconsistent. This constraint is defined as follows.

If the wire bound list, wire bound element, start point, input/output attribute="OUTPUT" then the wire bound list, wire bound element, end point, input/output attribute !="OUTPUT"

If the wire bound list, wire bound element, end point, input/output attribute="OUTPUT" then the wire bound list, wire bound element, start point, input/output attribute !="OUTPUT"

In short, in the wire bound list, if the input/output attribute of a terminal pointed by the start point of the wire bound is "OUTPUT", the input/output attribute of another terminal pointed by the end point of the wire bound must not be "OUTPUT". In the wire bound list, if the input/output attribute of a terminal pointed by the end point of the wire bound is "OUTPUT", the input/output attribute of another terminal pointed by start point of the wire bound must not be "OUTPUT".

The Constraint as for Data Type Attribute

This constraint is independent of the kind of symbol. For example, when the wire bound connects between the two terminals, it is impossible to connect two terminals whose data types are different, because the function on calculation of the symbol is mistakenly executed. This constraint is defined as follows:

If the wire bound list, wire bound element, start point, data type attribute=wire bound list, wire bound element, end point, data type attribute.

In short, in the wire bound list, the data type attribute of a terminal at the start point of the wire bound must be the same as the data type attribute of another terminal at the end point of the wire bound.

The Constraint as for Unit Attribute

This constraint is dependent on the kind of symbol, and two kinds of this constraint are used.

1. If unit of data connectable to the terminal of the symbol is constant, it is defined as the constraint.

For example, in the case where the first terminal of Symbol A must be connected to data of V (voltage), the following constraint is defined.
Symbol A. Terminal 1. unit="V"

In short, for all symbols using the symbol A, the unit attribute of first terminal must be "V".

2. As for a terminal of the same kind of symbol, the constraint corresponding to the status of the other terminal using the same symbol is defined.

For example, in the case where a unit of data wired to the first terminal of Symbol B must be same as the unit of data wired to the second terminal of Symbol B, the following constraint is defined.

Symbol B. terminal 1. unit=Symbol B. terminal 2. unit
Symbol B. terminal 2. unit=Symbol B. terminal 1. unit In short, for all symbols using Symbol B, the unit attribute of the first terminal must be the same as the unit attribute of the second terminal. The unit attribute of second terminal must be the same as the unit attribute of first terminal.

For example, assume that "Symbol B" includes two inputs, and outputs "truth" by comparing the two input values. In this case, the units of data sent to the two inputs must be same.

Figure 8:
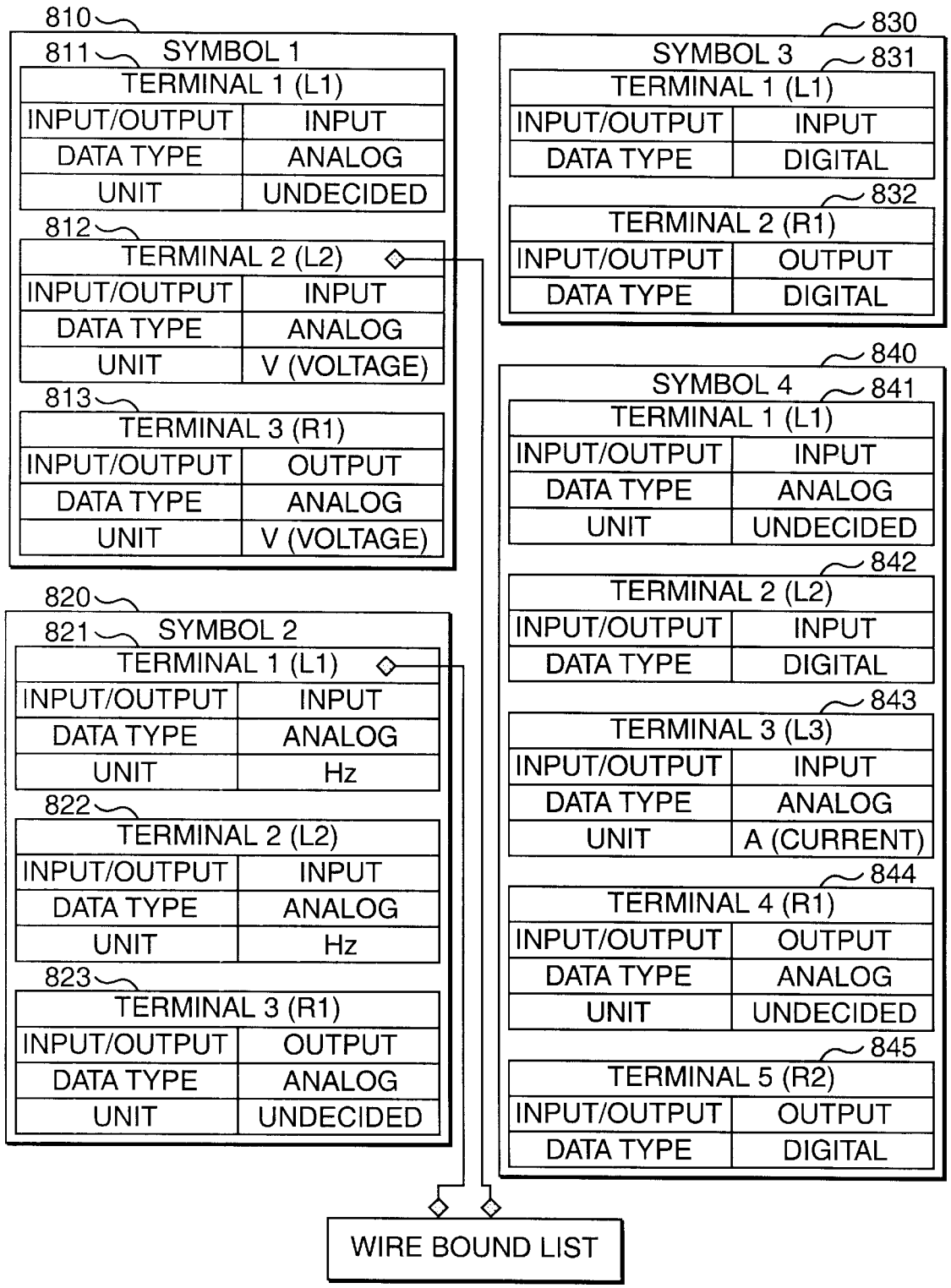
FIG. 8 is a schematic diagram of item data corresponding to the plan in FIG. 7.

Returning to the explanation of the real time operation indication section 30, based on information sent by the operation intention decision section 20, the real time operation indication section 30 generates navigational information according to the item data (the attribute value) and the constraint, and informs the user through the display section 2. FIG. 7 shows an example of a block chart in the case of a wired operation. In FIG. 7, four symbols 710, 720, 730, 740 are located and the user tries to operate the wire bound from terminal R1 (713) of Symbol 1 (710) to another symbol. By depressing the mouse button on the terminal R1, the operation intention decision section 20 decides to transition to the begining of the wired operation. At this time, the navigational information is generated by another description item and the constraint. FIG. 8 shows the data of each symbol element in the symbol list corresponding to the block chart in FIG. 7. FIG. 9 shows the constraint of unit attributes for each kind of the symbol.

Step 1

Figure 10:
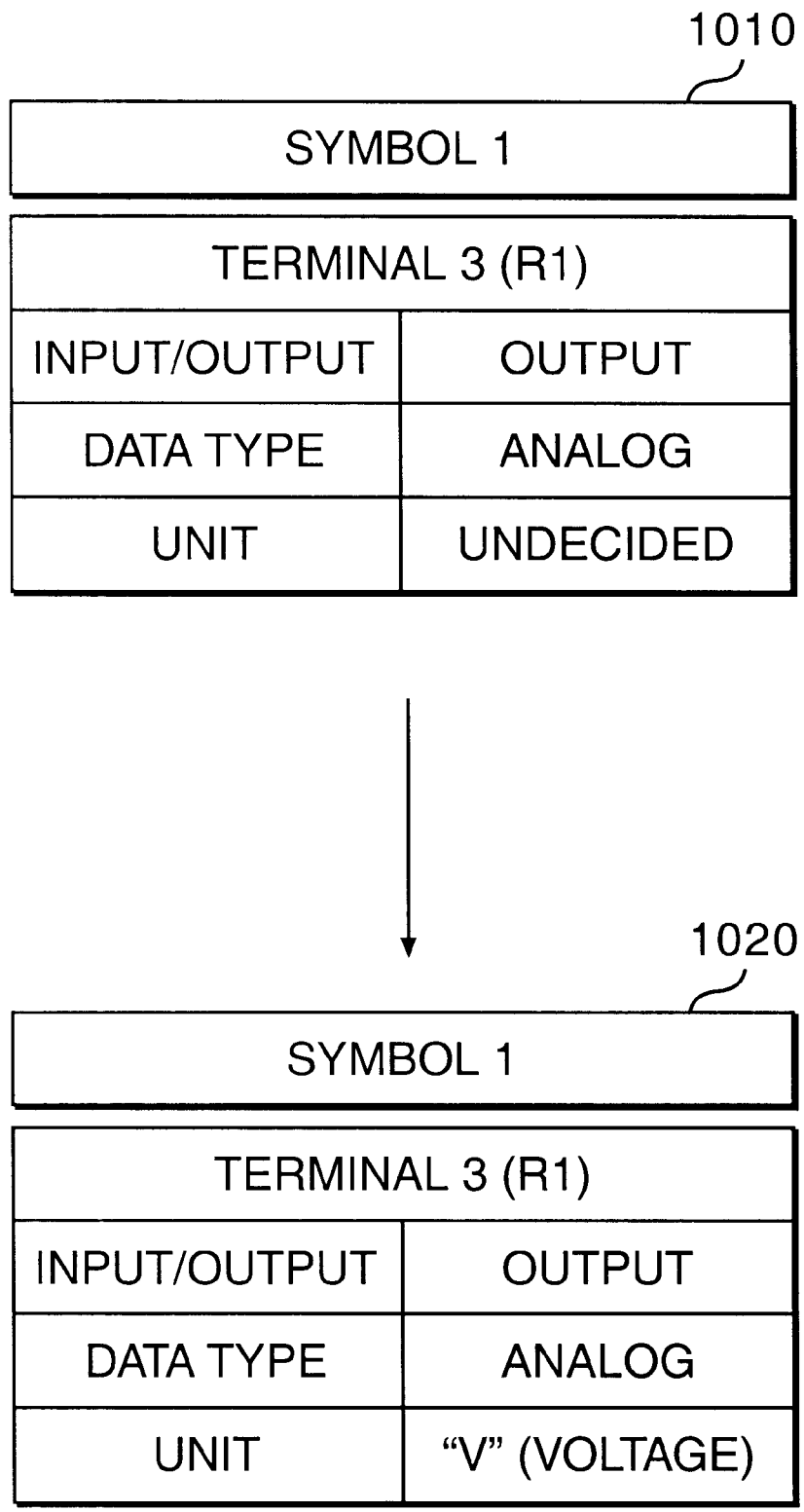
FIG. 10 is a schematic diagram of a sample item in which the attribute value is transmitted.

As for the terminal as the start point of the wire bound, the attribute data is retrieved from the symbol list. In FIG. 7, the wire operation is tried from the third terminal (R1: 713) of symbol 1 (710). Therefore, the symbol data (810) corresponding to symbol 1 is retrieved from the symbol list in FIG. 8. Furthermore, the terminal data (813) of the third terminal (TERMINAL 3) is retrieved from the symbol data (810). FIG. 10 shows the terminal data (1010) retrieved.

Step 2

According to the constraint, the attribute value of the terminal at the start point of the wire bound is supplementally estimated. The kind of the symbol (710) is "Symbol 1". Therefore, the constraint (910) of "Symbol 1" is extracted from the constraint information in FIG. 9. From the second constraint of "Symbol 1", the unit attribute of the third terminal must be the same as the unit attribute of the second terminal. In this case, the unit attribute value of the second terminal of the symbol (710) is retrieved. In FIG. 8, the unit attribute value of the second terminal (812) is "V". Therefore, this unit attribute value is reflected to the unit attribute value of the third terminal retrieved by Step 1. FIG. 10 shows the unit attribute value (1020) updated by "V".

Step 3

The terminal which is a candidate for end point of the wire bound is retrieved from the symbol list and the terminal set of wire bound candidates is generated. In this case, the terminal not linked by the wire bound is retrieved from the symbol list. In the symbol list of FIG. 8, the terminal not pointed to in the wire bound list is retrieved. In FIG. 7, terminals (711, 722, 723, 731, 732, 741, 742, 743, 744, 745) are retrieved. In short, in FIG. 11, the terminal elements without oblique lines are retrieved as candidates for end points of the wire bound.

Step 4

In the candidate for end points of the wire bound, the terminal selected as the end point of the wire bound is done so according to the constraint. In short, by refering to the constraint in the description constraint memory section 120, it is decided whether each retrieved terminal is wired.

Constraint Check as for Input/Output Attribute

Figure 11:
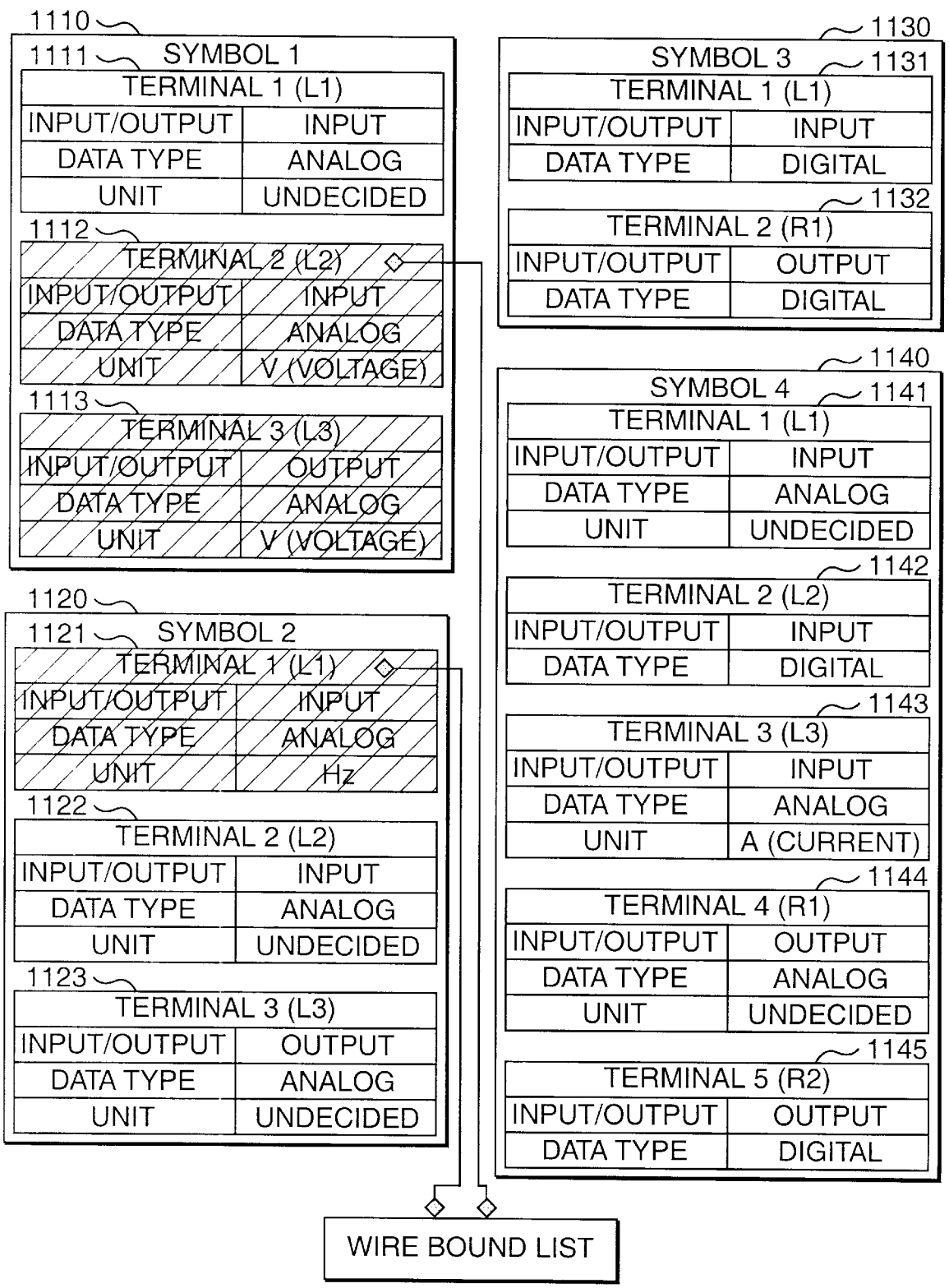
FIG. 11 is a schematic diagram of a sample decision process according to the constraint.

Two terminals both with an input/output attribute of "OUTPUT" must not be wired. This decision is executed by input/output attribute of the terminal of the start point and input/output attribute of retrieved terminal. In FIG. 7, the input/output attribute of terminal (713) is "OUTPUT" according to the item data (1113) of "TERMINAL 3". Therefore, the input/output attribute of the terminal of the end point must not be "OUTPUT". In FIG. 11, four terminals (1123, 1132, 1144, 1145) are excluded from being candidates for end point.

Constraint Check as for Data Type Attribute

Two terminals whose data types are different must not be wired. This decision is executed by the data type attribute of the terminal of the start point and data type attribute of the retrieved terminal. In FIG. 7, the data type attribute of the terminal (713) is "ANALOG" according to the item data (1113) of "TERMINAL 3". Therefore, the data type terminal of the terminal of the end point must be "ANALOG". In FIG. 11, two terminals (1131, 1142) are excluded from being candidates for end point.

Constraint Check as for Unit Attribute

Two terminals whose unit attributes are different must not be connected. This decision is executed according to the unit attribute of the terminal of the start point and the unit attribute of the retrieved terminal. In this case, the constraint governing the relation between two terminals is also referred. As shown in FIG. 11, the unit attribute (1113) of the terminal (713) of the start point is "V". After checking the data type attribute, four terminals (1111, 1122, 1141, 1143) remain. Therefore, these four terminals are checked to determine whether each unit attribute is the same as "V".

As for the symbol (710) of the first terminal (1111), the kind of symbol is SYMBOL 1. The constraint of the first terminal of SYMBOL 1 is not set and the unit attribute value of the first terminal (1111) is "UNDECIDED" which is not inconsistent with "V". Therefore, the first terminal (1111) remains a candidate for end point.

As for the symbol (720) of the second terminal (1122), the kind of symbol is SYMBOL 2. As shown in constraint (920)

of FIG. 9, the unit attribute of the second terminal of SYMBOL 2 must be the same as the unit attribute of the first terminal of SYMBOL 2. In FIG. 11, the unit attribute of the first terminal (1121) of SYMBOL 2 is "Hz". Therefore, the unit attribute of the second terminal (1122) of SYMBOL 2 is "Hz" which is inconsistent with "V". Therefore, the second terminal (1122) is excluded as a candidate for end point.

As for the symbol (740) of the first terminal (1141), the kind of symbol is SYMBOL 4. The constraint of the first terminal of SYMBOL 4 is not set and the unit attribute value of the first terminal (1141) is "UNDECIDED", which is not inconsistent with "V". Therefore, the first terminal (1141) remains candidate for end point.

As for the symbol (740) of the third terminal (1143), the kind of symbol is SYMBOL 4. As shown in constraint (930) in FIG. 9, the unit attribute of the third terminal of SYMBOL 4 must be "A" as a fixed attribute. The unit attribute of the third terminal (1143) of SYMBOL 4 is "A", which is inconsistent with "V". Therefore, the third terminal (1143) is excluded as the candidate for end point.

Figure 12:
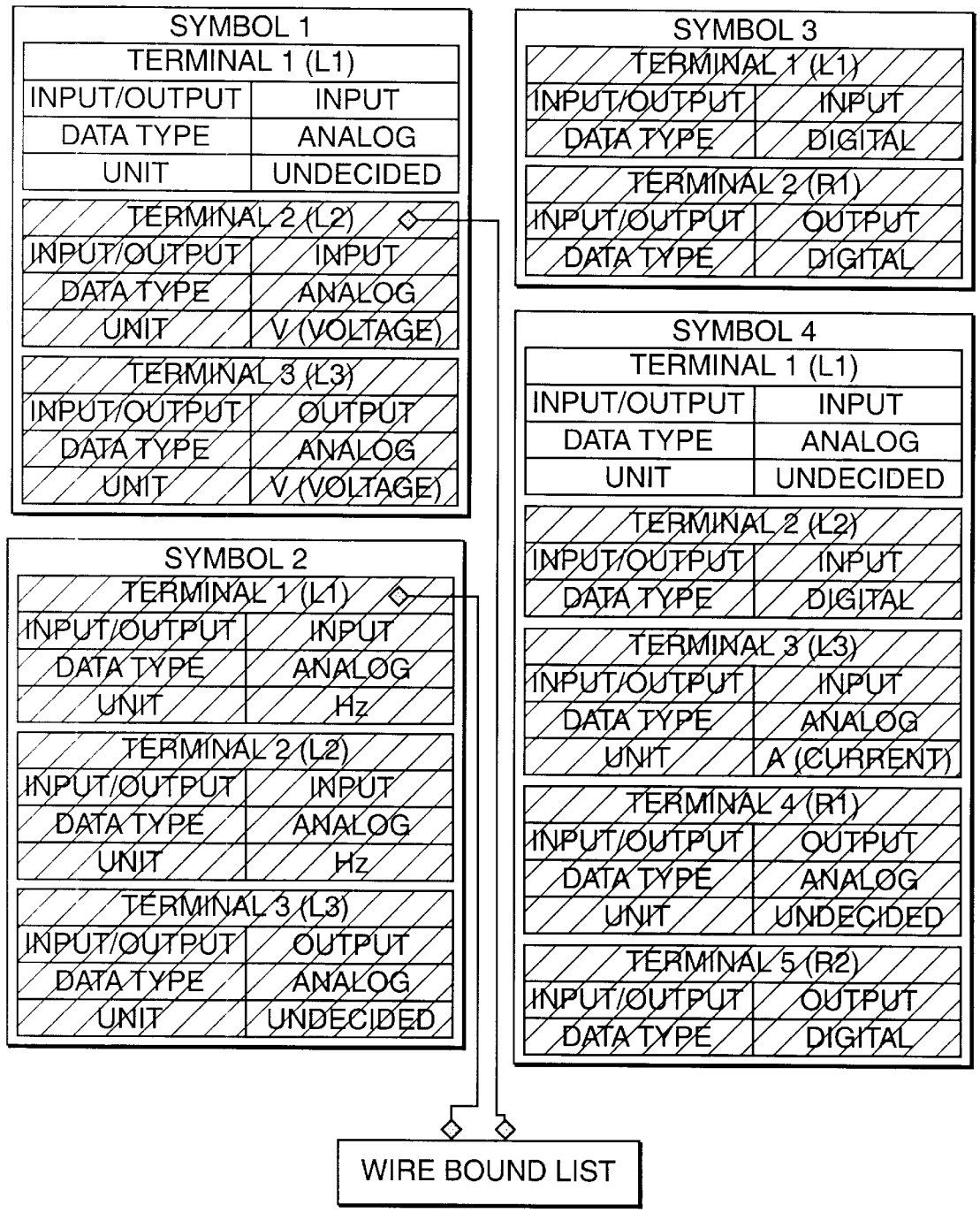
FIG. 12 is a schematic diagram of a sample decision result according to the constraint.

As a result, as shown in FIG. 12, two terminals (711, 741) (TERMINAL 1 of SYMBOL 1, TERMINAL 1 of SYMBOL 4) are selected as the end point wired by the start point (713).
Step 5

The terminals selected in Step 4 are presented through the display section 2. As a result of Step 4, in a wired operation in which a constraint must be satisfied, the terminal as the end point is limited in the block chart. Therefore, the end point information is outputted as navigational (support) information.

The selected terminal is emphatically displayed as follows:
blinking.
conspicuous color/line as compared with other terminals.
The non-selected terminal is unemphatically displayed as follows.
non-display.
inconspicuous color/line as compared with the selected terminal.

Figure 13:
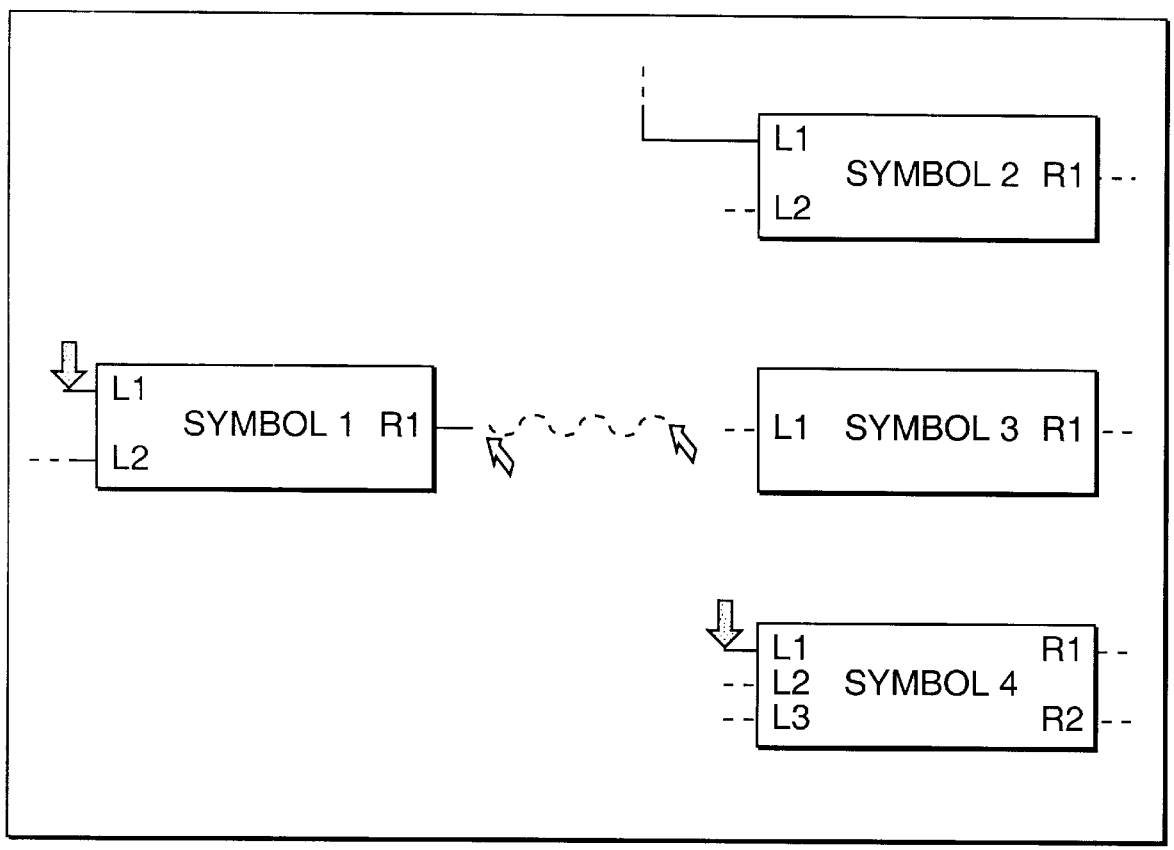
FIG. 13 is a schematic diagram of a sample plan in which navigation information is presented.

This navigational information is generated by the symbol element information in FIG. 12 and displayed by adding special effects during the display routine. This display continues while the operation intention decision section 20 determines that the user's operation has the status of a wired operation. FIG. 13 shows a screen of the block chart including the navigational information. In FIG. 3, the selected terminals (L1 of Symbol 1, L1 of Symbol 4) are displayed as thick arrow lines. Non-selected terminals are displayed as dotted lines. By using this navigational information, the user can smoothly execute the wired operation.

The Real Time Description Item Check Section 40/The Error Information Presentation Section 50

First, the operation intention decision section 20 detects the current operation of the left mouse button during the user's wired operation, and determines that the user's operation is transitted to status of non-operation. In this case, the real time description item check section 40 checks the end point of the wire bound by referring to the constraint. In short, the attribute value of the start point of the wire bound is retrieved and decided to be consistent with the attribute value of the end point. If the attribute value of the start point is determined to be inconsistent with the attribute value of the end point, the error information presentation section 50 outputs an error message including the applied constraint through the display section 2. In this case, the wired operation is invalid.

The Description Information Transition Section 60/The Description Item Attribute Estimate Section 70

Figure 14:
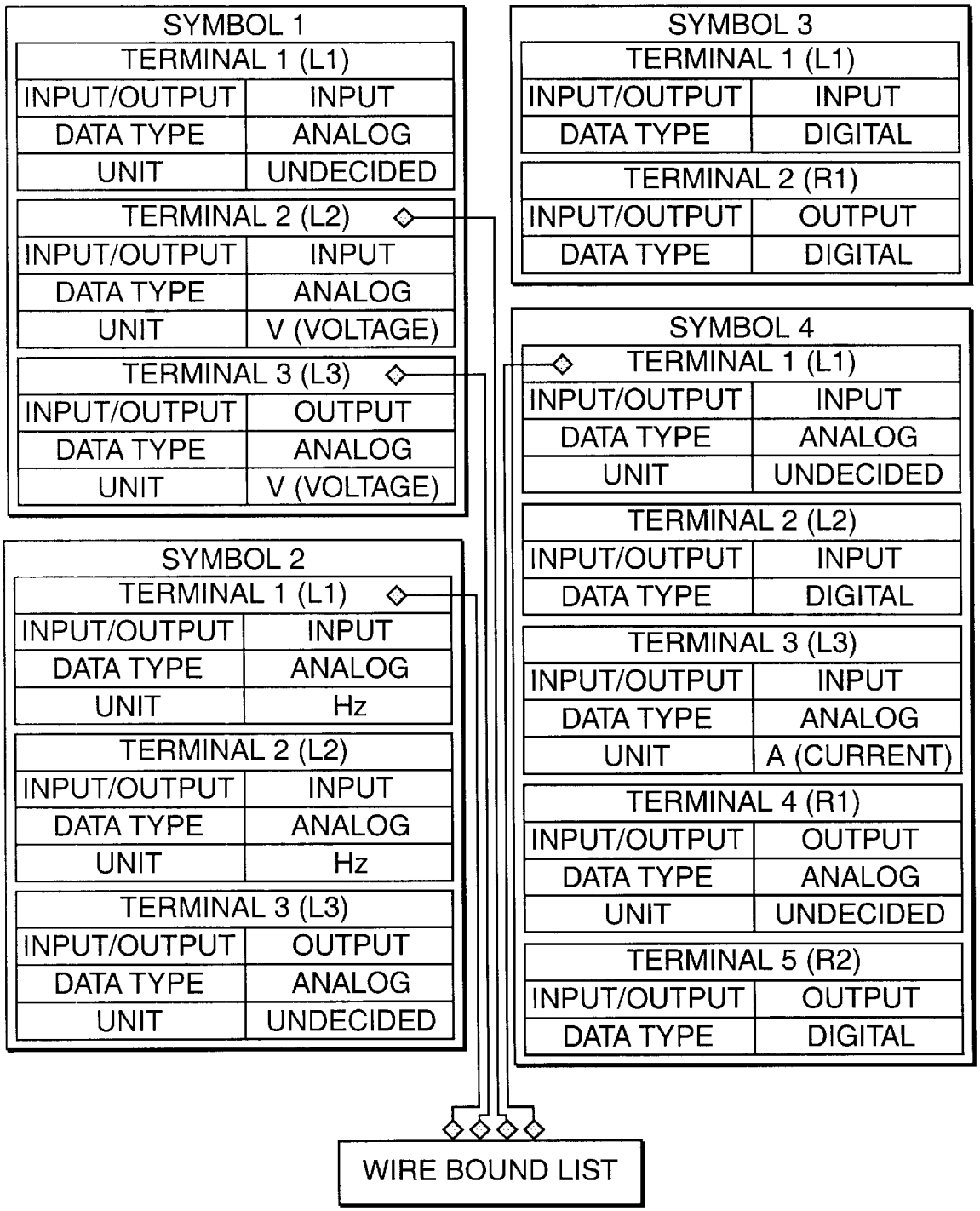
FIG. 14 is a schematic diagram of an example of items in which the attribute value is updated.

In case the real time description item check section 40 determines that the user's wired operation is correct, new information of the item is transmitted to the description item memory section 110 through the description information transmission section 60. In the wired operation of FIG. 7, if the start point is a terminal (713) and the end point is a terminal (741), one coordinate list is added in the wire bound list of FIG. 5 and the attribute values of the start point and end point are updated so that these attribute values coincide. The symbol list of the description item memory section 110 is rewritten as shown in FIG. 14. Whenever the attribute of the item is updated by an operation, the description information transmission section 60 transmits the update information to the description item attribute estimation section 70. The description item attribute estimation section 70 estimates the undecided attribute value of items related to the operated item.

Basic Transmission/Estimation Method (FIG. 15)
Step 1

By collecting the attribute value of the start point/the end point (the relation between two terminals linked by wired operation), the attribute value is transmitted bidirectionally based on the start point/the end point (Step 1501, 1502, 1503) as follows.

The attribute value of the start point terminal is transmitted to the end point terminal.
The attribute value of the end point terminal is transmitted to the start point terminal.

The meaning of the transmission is that the undecided attribute value of one side terminal is estimated by the attribute value of other side terminal (Step 1504, 1505). In case of updating the attribute value, the data of the symbol list is updated. In example of FIG. 14, the attribute value of the start point terminal is only transmitted, but this transmission is executed along bidirectionally.
Step 2

The received attribute value is transmitted to other terminals of the same symbol (step 1506, 1507). In short, if the attribute value of a terminal of one symbol is updated by a received attribute value, other terminals of the same symbol are also updated by the received attribute value and the constraint of the one symbol (step 1508, 1509). In this case, the data of the symbol list is updated.
Step 3

If the attribute value of all terminals of the one symbol is updated by the received attribute value, this attribute value is transmitted to other symbol wired by the one symbol (step 1510, 1511). In short, when the terminal of the one symbol whose attribute value is updated is wired to another symbol, the updated attribute value is also sent to the other symbol. Returning to step 2, this process is repeated whenever the attribute value of a related terminal is updated.

Figure 15:
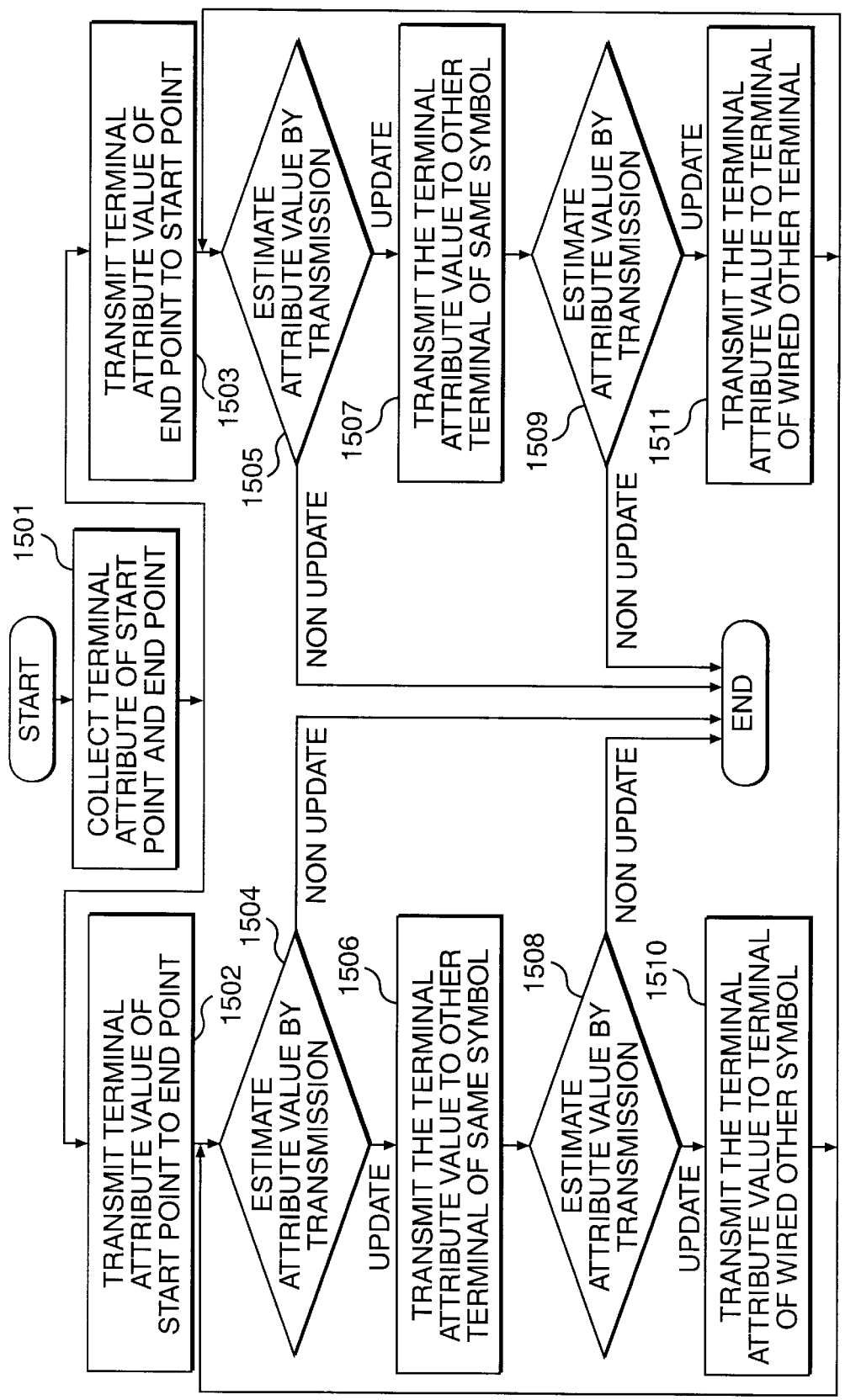
FIG. 15 is a flow chart of the process of transmitting the attribute value according to the present invention.
Figure 16:
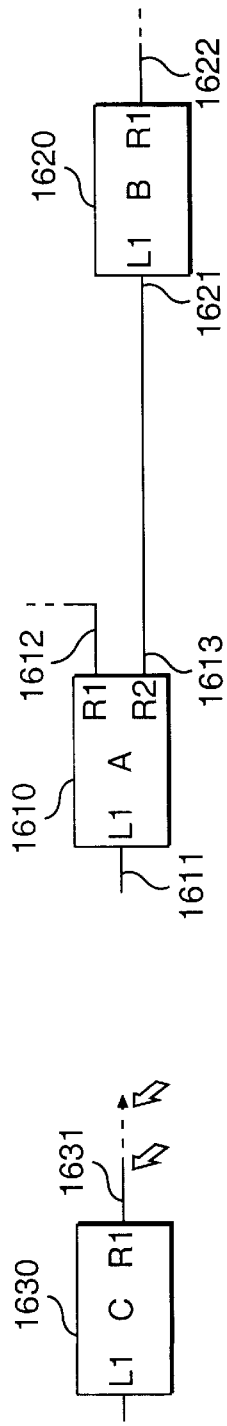
FIG. 16 is a flow chart of a sample plan and item data.
Figure 17:
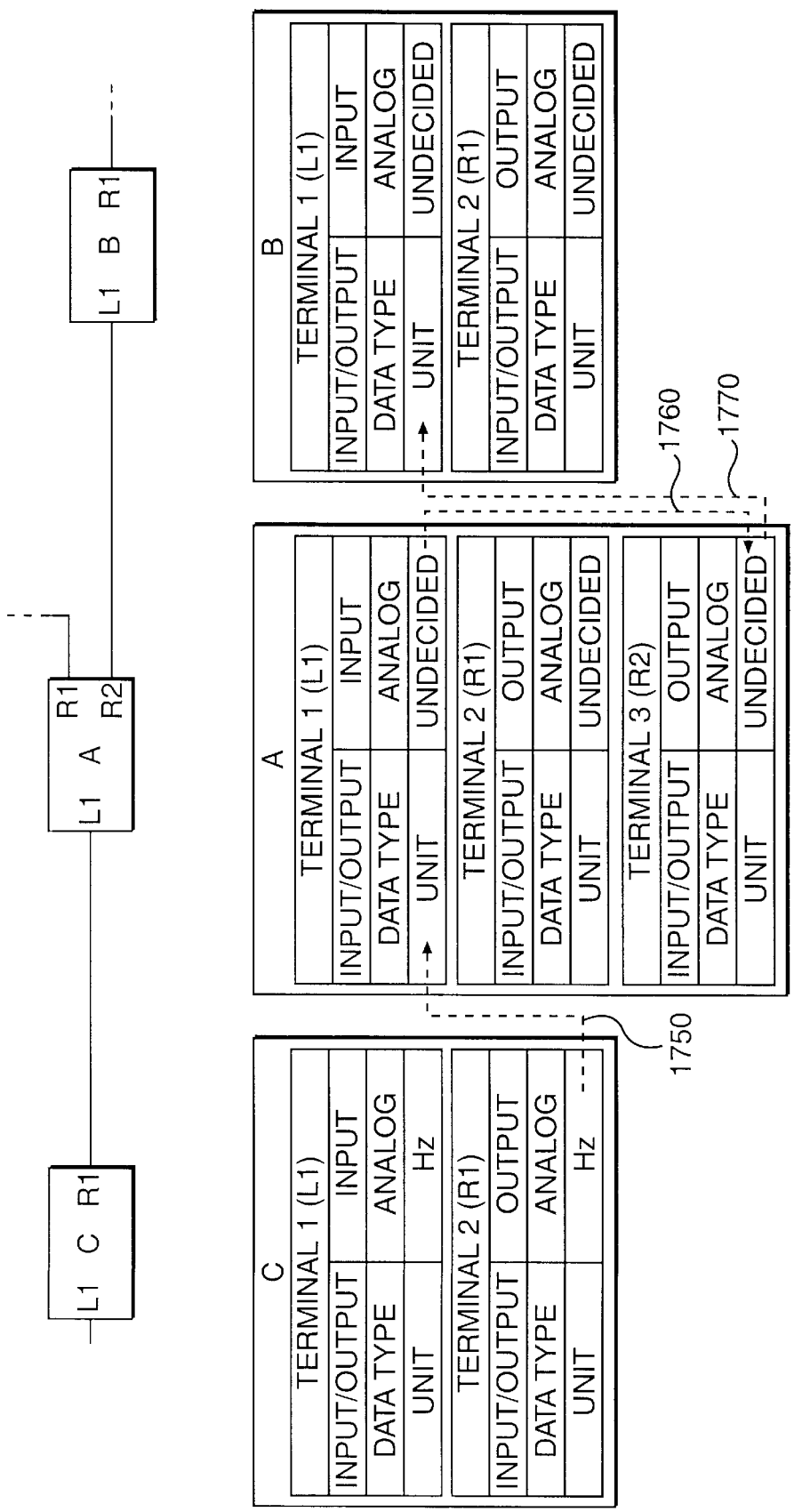
FIG. 17 is a schematic diagram of a sample plan and item data in which the attribute value is transmitted.

Each step (step 1, 2, 3) in FIG. 15 is explained using FIG. 16. In FIG. 16, the third terminal (1613) of symbol A (1610) is wired to first terminal (1621) of symbol B (1620). In the lower part of FIG. 16, attribute values of each item (TERMINAL) of each symbol (A, B, C) are shown. One constraint for symbol A is defined (unit attribute value of TERMINAL 3 of symbol A is same as unit attribute value of TERMINAL 1 of symbol A). In this situation, assume that the second terminal (1631) of symbol C is wired to the first terminal (1611) of symbol A (1610). This wired operation is valid because the attribute values of these two terminals do not include contradiction. In Step 1, the attribute value of TERMINAL 2 (1631) of symbol C (1630) is transmitted to TERMINAL 1 (1611) of symbol A (1610). As a result, the unit attribute value of TERMINAL 1 (1611) of symbol A (1610) is updated from "UNDECIDED" to "Hz". In Step 2, the updated unit attribute value ("Hz") of TERMINAL 1 (1611) of symbol A (1610) is transmitted to other terminal of symbol A (1610). The constraint between TERMINAL 1 and TERMINAL 3 of symbol A is already defined. Therefore, the unit attribute value of TERMINAL 3 (1613) of symbol A (1610) is updated from "UNDECIDED" to "Hz". In Step 3, the updated unit attribute value ("Hz") of TERMINAL 3 (1613) of symbol A (1610) is transmitted to other symbols wired to symbol A. In FIG. 16, TERMINAL 3 (1613) of Symbol A (1610) is wired to TERMINAL 1 (1621) of symbol B (1620). Therefore, the updated attribute value ("Hz") of TERMINAL 3 (1613) of symbol A (1610) is transmitted to TERMINAL 1 (1621) of symbol B (1620). As a result, the unit attribute value of TERMINAL 1 (1621) of symbol B (1620) is updated from "UNDECIDED" to "Hz". In the same manner, this updated attribute value of TERMINAL 1 (1621) of symbol B (1620) is transmitted to other symbols through TERMINAL 2 (1622). Finally, the updated data in FIG. 17 is stored in the symbol list. Transmission at Step 1 is 1750, Transmission at Step 2 is 1760, and Transmission at Step 3 is 1770.

Processing for Branch Point in Block Chart

Figure 18:
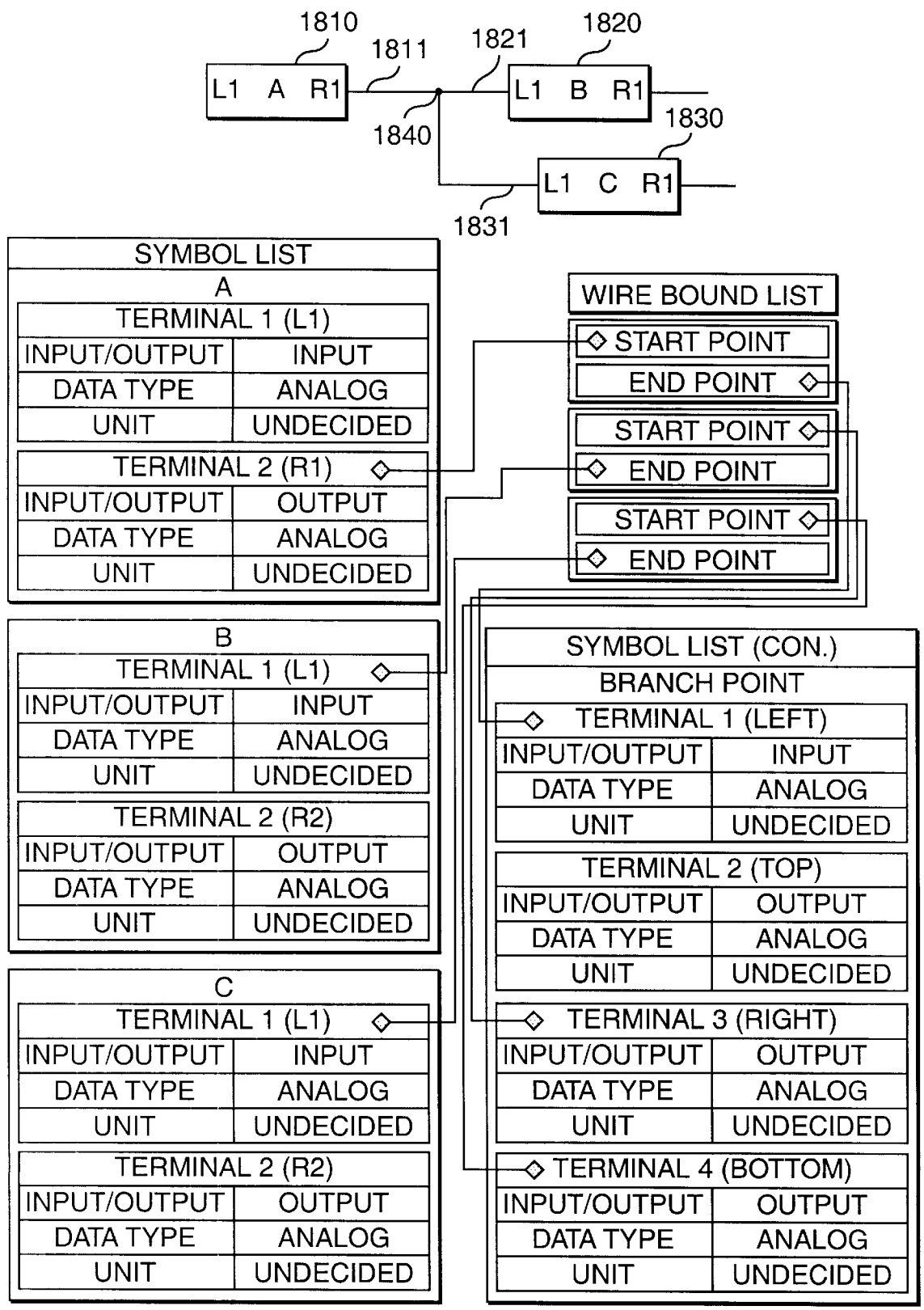
FIG. 18 is a schematic diagram of a sample plan and item data including a branch point.

The branch point represents a special symbol linking the first wire bound with the second wire bound. In FIG. 18, the input/output attribute of TERMINAL 2 (1811) of symbol A (1810) is "OUTPUT" and data flowing from TERMINAL 2 (1811) is inputted to the branch point (1840). This data is sent from the branch point (1840) to TERMINAL 1 (1821) of symbol B (1820) and TERMINAL 1 (1831) of symbol C (1830). The branch point virtually includes four wire bounds along four direction (left, top, right, bottom). These four wire bounds are respectively defined as terminal (TERMINAL 1, TERMINAL 2, TERMINAL 3, TERMINAL 4). (In the upper part of FIG. 18, the branch point (1840) actually includes three wire bounds (left, right, bottom).) For example, when the user depresses a mouse button on the first wire bound and releases the mouse button on another terminal, the clicked point on the first wire bound is a branch point. Otherwise, when the user draws the wire bound from one terminal by depressing the mouse button and releasing it on another wire bound, the detached point on the other wire bound is a branch point. All attribute values of the four terminals (left, top, right, bottom) of the branch point are non-fixed attributes. The constraint of the branch point is represented as follows.

Input/output . . . The input/output attribute of the four terminals of the branch point may be either "INPUT" or "OUTPUT". This attribute value is changed by the input/output attribute value of the other symbol wired to the branch point.

Only one terminal of the branch point has an "INPUT" attribute.

If the attribute value of one terminal of the branch point is "INPUT", the attribute value of the other three terminals of the branch point is "OUTPUT".

In other cases, the input/output attribute is "UNDECIDED".

Data type . . . Data type attribute values of the four terminals of the branch point are the same. This attribute value is changed by the attribute value of the other symbol wired to the branch point. The constraint for the data type attribute is as follows.

If the data type attribute value of one terminal of the branch point is determined, the data type attribute values of the other three terminals of the branch point are also determined as the same value.

Unit . . . The unit attribute values of the four terminals of the branch point are the same. This attribute value is changed by the attribute value of the other symbol wired to the branch point. The constraint for the unit attribute is as follows.

If the unit attribute value of one terminal of the branch point is determined, the unit attribute values of the other three terminals of the branch point are also determined as the same value.

Figure 19:
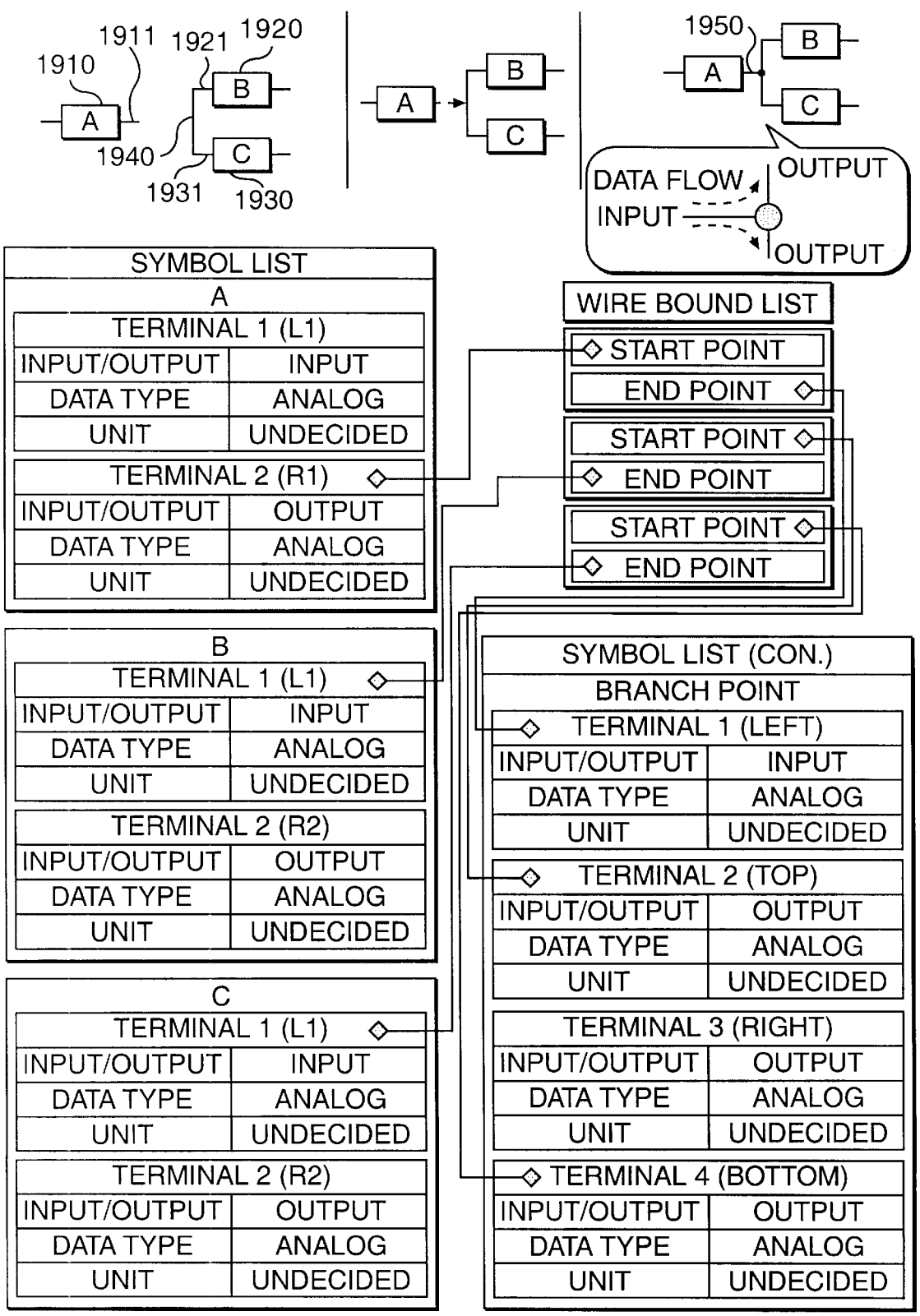
FIG. 19 is a schematic diagram of a sample plan and item data including another branch point.

In FIG. 19, TERMINAL 2 (1911) of symbol A (1910) is connected to a wire bound (1940) between symbol B (1920) and symbol C (1930). In this case, the new wire bound (1950) is checked for the attribute value of the start point and the end point. As shown in FIG. 19, the input/output attribute value of TERMINAL 2 (1911) of symbol A (1910) is "OUTPUT". The input/output attribute value of TERMINAL 1 (1921) of symbol B (1920) and TERMINAL 1 (1931) of symbol C (1930) is "INPUT". The input/output attribute value of TERMINAL 2 (1911) as a start point of a new wire bound is "OUTPUT". However, the input/output attribute value of the end point is not directly retrieved because the end point is a branch point. Therefore, by the tracing other wire bound linked to the branch point, the input/output attribute value of the end point is estimated. In the example of FIG. 19, the branch point is linked to the wire bound (1940) between TERMINAL 1 (1921) of symbol B (1920) and TERMINAL 1 (1931) of symbol C (1930). Therefore, it is possible that the input/output attribute value of the end point is either "INPUT" or "OUTPUT". However, the attribute value of the end point must be "INPUT" because the attribute value of the start point is fixed as "OUTPUT". As shown the window immediately beneath the right side of the block diagram on the upper portion of FIG. 19, the input/output attribute value of the left side of the branch point is estimated as "INPUT" and the input/output attribute values of top side and bottom side of the branch point are respectively estimated as "OUTPUT". In this place, the constraint is that the input/output attribute value of one side of wire bound is "OUTPUT", the input/output attribute value of other side of the wire bound is "INPUT". As a result, the information on the symbol list is generated, as shown in lower part of FIG. 19.

As mentioned-above, in case of generating the branch point, the wire bound linked to the branch point is traced in order to estimate the input/output attribute value. If the input/output attribute value is not determined, it is remains "UNDECIDED".

The transmission of the input/output attribute value for the branch point is executed as follows. When the connection of the branch point is correctly completed, the input/output attribute value is transmitted in order to determine the attribute of the terminals of the branch point. In the upper left part of FIG. 20, assume that the input/output attribute values of the branch point (2010) and the branch point (2020) is "UNDECIDED", and a branch point (2040) is generated by drawing a new wire bound from symbol A (2030) to the wire bound connected to the branch point (2020). In this case, first, the attribute value of both sides of the new wire bound is transmitted. If the input/output attribute value of second terminal (2031) of symbol A (2030) is "OUTPUT", the input/output attribute value of the left side terminal of the branch point (2040) is estimated as "INPUT". Next, this attribute value is transmitted to the other terminals of the branch point (2040). In this case, the input/output terminal of the other two terminals (top terminal, bottom terminal) is estimated as "OUTPUT".

Next, the attribute value of each terminal of the branch point is transmitted to the other symbol through the wire bound. In FIG. 20, the attribute value of the bottom terminal of the branch point (2020) wired to the branch point (2040) is estimated as "INPUT". Furthermore, after transmitting the attribute value in the branch point (2020), the attribute values of the four terminals of the branch point (2010) are respectively estimated. This result is shown in the lower side of FIG. 20. By using this method, the input/output attribute value is transmitted to all transmittable areas and an "UNDECIDED" attribute value of the terminal of the branch point is determined. This updated attribute value is stored in a symbol list. As for other attribute values (data type, unit), the determined attribute value is transmitted in the same way.

In this way, as for the non-fixed attribute value of the branch point, transmission/estimation is executed through the wire bound, and the accuracy of the real time operation indication section 30 and the real time description item check section 40 increases.

In an alternative wired operation, the first terminal wired to the second terminal is changed to wire to a third terminal. In this case, when the first terminal is cut from the second terminal, the attribute value of the first terminal is initialized. When the first terminal is wired to the third terminal, the attribute value of the first terminal is updated as mentioned-above. In case of deleting the wire bound, the attribute value of the terminals connected by the wire bound is initialized so that the data of symbol list are consistent each other.

The Description Item Batch Check Section 80

As for the block chart not checked by the real time description item check section 40, the description item batch check section 80 transmits the attribute value of each terminal among all symbols and checks whether the transmitted result is consistent with the constraint. First, the block diagram is stored in the description item memory section 110 and the fixed-attribute value of the symbol element in the symbol list is retrieved according to the constraint. By tracing the wire bound list, the attribute value of each symbol is transmitted through the description information transmission section 60. If the attribute value of the other symbol is "UNDECIDED", the attribute value is estimated by the description item attribute estimation section 70. If the attribute value is determined, it is stored in the symbol list and transmitted to the other symbol. In this case, if the transmitted attribute value is inconsistent with the attribute value of the other symbol, an error message is displayed to the user through the display section 2.

Next, another embodiment of the present invention is explained. In a window system using GUI, the following situation is assumed. The user selects an icon of a file with the mouse and moves the icon to a printer icon to operate the printer on display. In the upper part of FIG. 21, window (2110) showing the status of the operation beginning is shown. The "FILE" icon is selected and moved on the window. When the icon is selected, the operation intention decision section 20 generates candidate operations for the "FILE" by referring data to the operation kind memory section 100. When the icon is moved, the operation intention decision section 20 moves this file to another directory, or generates the operation intention that the file is inputted to the printer. When the icon begins to move, the operation intention is not determined. When the icon "FILE" enteres the area of the group of printer icons (lower part (2120) of FIG. 21), the operation intention decision section 20 determines the user's intention to print the file. At this point, the real time operation indication section 30 presents the navigational information to the user according to the constraints for the printer operation. In FIG. 1, the description constraint memory section 120 stores the constraint for the printer operation. Therefore, the navigational information is generated using this constraint.

Figure 21:
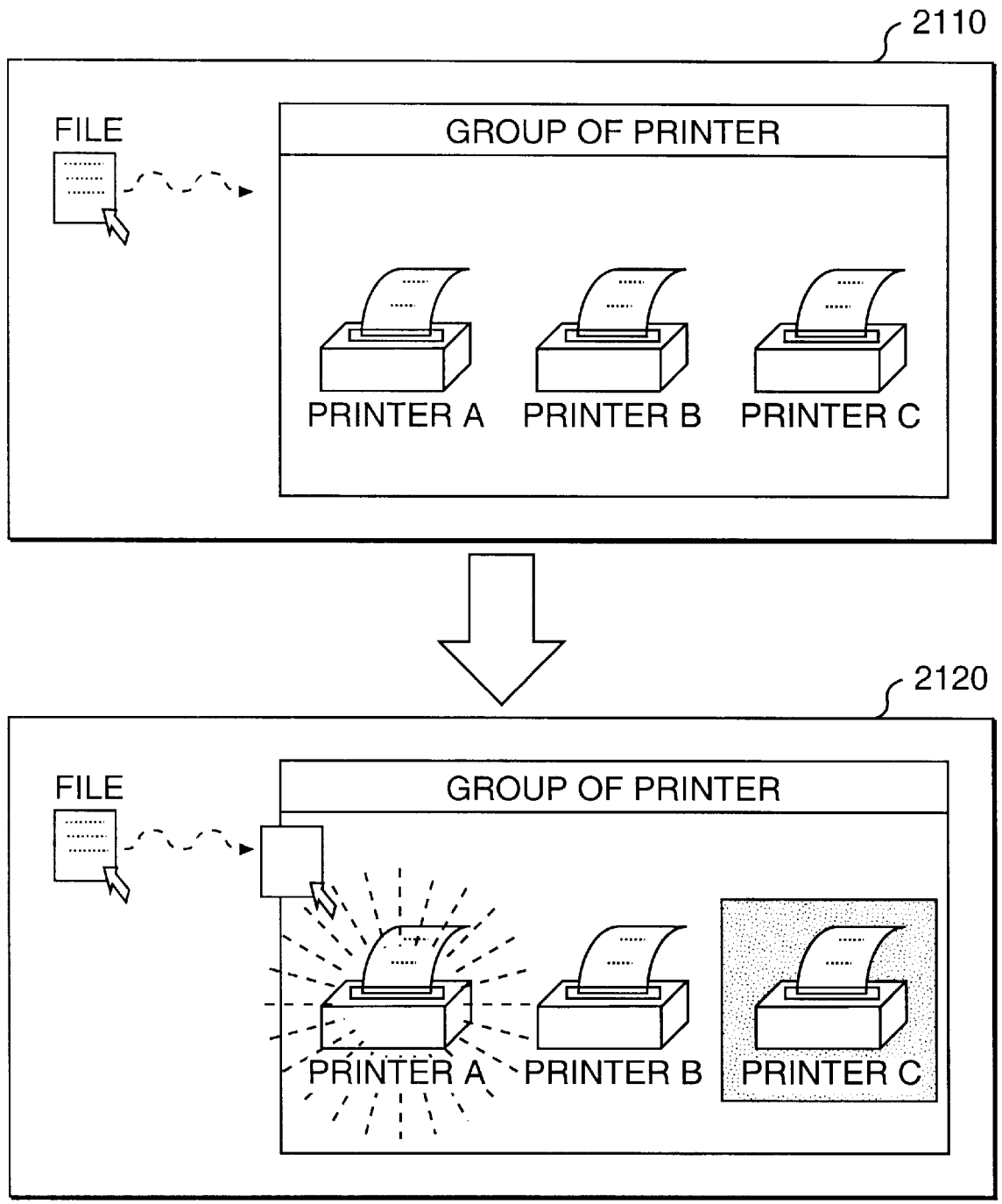
FIG. 21 is a schematic diagram of a sample display of the user's operation to indicate the icon.

The file-attributes are as follows.
(1) File size
(2) File for printing in black-and-white
(3) File for printing in color The printer-attributes are as follows.
(1) Possible/impossible printing in black-and-white (fixed-attribute)
(2) Possible/impossible printing in color (fixed-attribute)
(3) Printing ability (fixed-attribute)
(4) File during printing/files awaiting print and the size of those file
(5) Possible/impossible use now The constraints of the printing operation are as follows.
(1) The file is not inputted to the non-used printer (printer-attribute (5)).
(2) The first priority printer to finish printing fastest is selected by comparing the file size (printer-attribute (4)) inputted to printer, printing ability (printer-attribute (3)) and the file size (file-attribute (1)) to be inputted.
(3) The file for printing in color (file-attribute (3)) must not be inputted to the printer for black-and-white.
(4) Others When "FILE" enteres the area of the printer group, the real time operation indication section 30 generates the operation indication by comparing the file-attribute with the printer-attribute. In FIG. 21, assume that "FILE" includes color, "PRINTER A" can print by color and is not printing another file now, "PRINTER B" can print by color and is printing another file now, "PRINTER C" is in a "Non-use" status. "PRINTER A" is selected as a suitable printer according to the attribute of three printers and the constraints of the printer. Therefore, the display of the printer icon is changed on the window. As shown in screen 2120 of FIG. 21, "PRINTER C" icon is not displayed or displayed by light color because it cannot be used. Both "PRINTER A" and "PRINTER B" can be used. However, the "PRINTER A" icon is emphatically displayed to the user. As a method for emphatically displaying, blinking, dark color/light color, and size are used.

In the constraints of the print operation, constraint (2) is sometimes contrary to constraint (3) according to situation. For example, even if the file includes color, it often happens that the printer for color is busy, but the printer for black-and-white is not. In that case, the priority degree is assigned to the constraint or variable as determined by the user.

As navigational information to the user, the constraint information may be presented as characters through a display. For example, a message "Printing in black-and-white is fastest" is displayed below the "PRINTER A" icon. Another sentence "color-printing is possible. XX minutes untill start of printing" is displayed below "PRINTER B" icon. In this case, the user can select his desired printer by watching these messages.

A memory can be used to store instructions for performing the process described above. Such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An operation support apparatus, comprising:
   item memory means for storing a plurality of symbols, each symbol including a plurality of items and attribute data for each item;
   display means for displaying the plurality of symbols arranged, each symbol including the plurality of items to be operated;
   input means for inputting a user's operation for one item in one symbol;
   intention decision means for deciding an operation intention according to the user's operation;
   estimation means for estimating a permissible future operation of the user based on the operation intention and the attribute data of each item, wherein particular items to be operated by the permissible future operation are discriminated from other items during displaying the plurality of symbols; and
   attribute transmission means for transmitting the attribute data of the one item to one particular item when the one item is connected to the one particular item by the user's operation, and for updating undecided attribute data of the one particular item by transmitted attribute data if attribute data of the one particular item includes undecided value.

2. The operation support apparatus according to claim 1, further comprising an operation kind memory means for storing a series of operations as status transition of operation,
   wherein said intention decision means decides the operation intention for the user's operation by referring to the operation kind memory means.

3. The operation support apparatus according to claim 1, wherein the attribute data of each item includes a fixed attribute value and a non-fixed attribute value, the non-fixed attribute value being updatable.

4. The operation support apparatus according to claim 1, wherein said item memory means stores symbol data and wire bound data, the symbol data including a coordinate of a symbol, at least one item and attribute data, and the wire bound data including a start point and an end point as wire bound between two items.

5. The operation support apparatus according to claim 4, further comprising a constraint memory means for storing constraint information representing a relation between two items by unit of symbol,
   wherein said estimation means estimates the permissible future operation of the user according to the operation intention, the attribute data, and the constraint information.

6. The operation support apparatus according to claim 5, further comprising an item check means for deciding whether the attribute value of a first item is consistent with the attribute value of a second item, when the first item is wired to the second item by a user's operation.

7. The operation support apparatus according to claim 6, further comprising error information presentation means for presenting error information through said display means, if said item check means decides that the attribute value of the first item is inconsistent with the attribute value of the second item, and returns said display means to pre-status of input of the user's operation.

8. The operation support apparatus according to claim 7, wherein said attribute transmission means transmits an updated attribute value of the second item to an other item of the same symbol if the same symbol includes the other item, and undecided attribute value of the other item is updated by transmitted attribute value.

9. The operation support apparatus according to claim 8, wherein said attribute transmission means transmits the updated attribute value of the other item of the same symbol to other symbol if the same symbol is wired to the other symbol, an item of the other symbol is updated by transmitted attribute value.

10. The operation support apparatus according to claim 4, wherein said item memory means stores branch point data as symbol data, one branch point corresponding to one symbol and each branch line of the branch point corresponding to one item of the one symbol.

11. The operation support apparatus according to claim 1, wherein said estimation means determines a group of items as objects set to be operated by the user according to a move operation if the move operation for one item is inputted through said input means during displaying the plurality of items.

12. The operation support apparatus according to claim 11,
    wherein said estimation means decides whether the attribute value of the one item is consistent with attribute value of each item of the group, and
    wherein said display means variably displays each item of the group according to respective degree of consistency of the attribute value.

13. An operation support method, comprising the steps of:
    storing a plurality of symbols, each symbol including a plurality of items and attribute data for each item;
    displaying the plurality of symbols arranged, each symbol including the plurality of items to be operated;
    inputting a user's operation for one item in symbol;
    deciding an operation intention according to the user's operation;
    estimating a permissible future operation of the user according to the operation intention and the attribute data of each item;
    discriminating particular items corresponding to the permissible future operation during displaying the plurality of symbols;
    transmitting the attribute data of the one item to one particular item when the one item is connected to the one particular item by the user's operation; and
    updating undecided attribute data of the one particular item by transmitted attribute data if the attribute data of the one particular item includes undecided value.

14. The operation support method according to claim 13, further comprising the step of:
    deciding whether the attribute value of the one item is consistent with the attribute value of the other item at the estimating step.

15. A computer readable memory containing computer readable instructions, comprising:
    instruction means for causing a computer to store a plurality of symbols, each symbol including a plurality of items and attribute data for each item;

instruction means for causing a computer to display the plurality of symbols arranged, each symbol including the plurality of items to be operated;

instruction means for causing a computer to input a user's operation for one item in one symbol;

instruction means for causing a computer to decide an operation intention according to the user's operation;

instruction means for causing a computer to estimate a permissible future operation of the user according to the operation intention and the attribute data of each item;

instruction means for causing a computer to discriminate particular items corresponding to the permissible future operation during displaying the plurality of symbols;

instruction means for causing a computer to transmit the attribute data of the one item to one particular item when the one item is connected to the one particular item by the user's operation; and instruction means for causing a computer to update undecided attribute data of the particular item by transmitted attribute data if the attribute data of the particular item includes undecided value.

16. The computer readable memory containing computer readable instructions according to claim 15, further comprising:

instruction means for causing a computer to decide whether the attribute value of the one item is consistent with the attribute value of the other item at estimation of the permissible future operation.

* * * * *